US012339404B2

(12) United States Patent
Droz et al.

(10) Patent No.: US 12,339,404 B2
(45) Date of Patent: Jun. 24, 2025

(54) LIGHT DETECTION AND RANGING (LIDAR) DEVICE WITH AN OFF-AXIS RECEIVER

(71) Applicant: Waymo LLC, Mountain View, CA (US)

(72) Inventors: Pierre-Yves Droz, Los Altos, CA (US); Simon Verghese, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/412,700

(22) Filed: Jan. 15, 2024

(65) Prior Publication Data

US 2024/0151834 A1 May 9, 2024

Related U.S. Application Data

(63) Continuation of application No. 16/700,543, filed on Dec. 2, 2019, now Pat. No. 11,906,671, which is a (Continued)

(51) Int. Cl.
*G01S 17/42* (2006.01)
*G01S 7/48* (2006.01)
(Continued)

(52) U.S. Cl.
CPC ............ *G01S 7/497* (2013.01); *G01S 7/4804* (2013.01); *G01S 17/04* (2020.01); *G01S 17/42* (2013.01);
(Continued)

(58) Field of Classification Search
None
See application file for complete search history.

(56) References Cited

U.S. PATENT DOCUMENTS 5,504,577 A 4/1996 Lonnqvist et al.
5,699,151 A 12/1997 Akasu
(Continued)

FOREIGN PATENT DOCUMENTS

CN 101356450 A 1/2009
CN 103105612 A 5/2013
(Continued)

OTHER PUBLICATIONS

Hawkes, Advances in Imaging and Electron Physics, vol. 112, ISBN 0-12-014754-8, 2000 (Year: 2000).
(Continued)

*Primary Examiner* — Hovhannes Baghdasaryan
(74) *Attorney, Agent, or Firm* — MCDONNELL BOEHNEN HULBERT & BERGHOFF LLP

(57) ABSTRACT

In one example, a LIDAR device includes a light sources that emits light and a transmit lens that directs the emitted light to illuminate a region of an environment with a field-of-view defined by the transmit lens. The LIDAR device also includes a receive lens that focuses at least a portion of incoming light propagating from the illuminated region of the environment along a predefined optical path. The LIDAR device also includes an array of light detectors positioned along the predefined optical path. The LIDAR device also includes an offset light detector positioned outside the predefined optical path. The LIDAR device also includes a controller that determines whether collected sensor data from the array of light detectors includes data associated with another light source different than the light source of the device based on output from the offset light detector.

20 Claims, 10 Drawing Sheets

Related U.S. Application Data continuation of application No. 15/396,476, filed on Dec. 31, 2016, now Pat. No. 10,520,592.

(51) Int. Cl.

| | |
|---|---|
| ***G01S 7/497*** | (2006.01) |
| ***G01S 17/04*** | (2020.01) |
| ***G01S 17/931*** | (2020.01) |
| ***G05D 1/00*** | (2006.01) |
| ***G05D 1/247*** | (2024.01) |

(52) U.S. Cl.

CPC .......... *G01S 17/931* (2020.01); *G05D 1/0231* (2013.01); *G05D 1/247* (2024.01)

(56) References Cited

U.S. PATENT DOCUMENTS

| | | | |
|---|---|---|---|
| 5,880,836 | A | 3/1999 | Lonnqvist |
| 6,556,282 | B2 | 4/2003 | Jamieson et al. |
| 8,050,863 | B2 | 11/2011 | Trepagnier et al. |
| 8,600,656 | B2 | 12/2013 | Mimeault et al. |
| 8,619,241 | B2 | 12/2013 | Mimeault |
| 8,736,818 | B2 | 5/2014 | Weimer et al. |
| 8,836,922 | B1 | 9/2014 | Pennecot et al. |
| 9,354,318 | B1 | 5/2016 | Beard et al. |
| 9,360,554 | B2 | 6/2016 | Retterath et al. |
| 9,705,283 | B1 | 7/2017 | Deppe et al. |
| 10,520,592 | B2 | 12/2019 | Droz et al. |
| 11,906,671 | B2 | 2/2024 | Droz et al. |
| 2004/0208340 | A1 | 10/2004 | Kirschner |
| 2007/0228262 | A1 | 10/2007 | Cantin et al. |
| 2008/0094605 | A1 | 4/2008 | Drodofsky et al. |
| 2008/0161986 | A1 | 7/2008 | Breed |
| 2010/0020306 | A1 | 1/2010 | Hall |
| 2010/0208244 | A1 | 8/2010 | Earhart et al. |
| 2011/0216304 | A1 | 9/2011 | Hall |
| 2012/0130588 | A1 | 5/2012 | Hukkeri |
| 2012/0287417 | A1 | 11/2012 | Mimeault |
| 2013/0026384 | A1 | 1/2013 | Kim et al. |
| 2013/0050676 | A1 | 2/2013 | d'Aligny |
| 2013/0120761 | A1 | 5/2013 | Dyer et al. |
| 2014/0252209 | A1 | 9/2014 | Land et al. |
| 2015/0131080 | A1 | 5/2015 | Retterath et al. |
| 2016/0274222 | A1 | 9/2016 | Yeun |
| 2016/0282468 | A1 | 9/2016 | Gruver et al. |
| 2016/0349379 | A1* | 12/2016 | Lacaze .................. G01S 19/215 |
| 2018/0136321 | A1 | 5/2018 | Verghese et al. |

FOREIGN PATENT DOCUMENTS

| | | | |
|---|---|---|---|
| CN | 103502841 | A | 1/2014 |
| EP | 3091342 | A1 | 11/2016 |
| JP | H07-182600 | A | 7/1995 |
| JP | H07-325152 | A | 12/1995 |
| JP | H08-015415 | A | 1/1996 |
| JP | H10-111360 | A | 4/1998 |
| JP | 2007-085832 | A | 4/2007 |
| JP | 2010-091378 | A | 4/2010 |
| JP | 2013-113669 | A | 6/2013 |
| JP | 2013-160769 | A | 8/2013 |
| JP | 2016-176750 | A | 10/2016 |
| WO | 2013127973 | A1 | 9/2013 |

OTHER PUBLICATIONS

International Search Report and Written Opinion, dated Mar. 23, 2018, from International Patent Application No. PCT/US2017/066133.

* cited by examiner

314

LIGHT DETECTION AND RANGING (LIDAR) DEVICE WITH AN OFF-AXIS RECEIVER

CROSS-REFERENCE TO RELATED APPLICATIONS

This application is a continuation of application Ser. No. 16/700,543, filed Dec. 2, 2019, which is a continuation of application Ser. No. 15/396,476, filed Dec. 31, 2016. The foregoing applications are incorporated herein by reference.

BACKGROUND

A vehicle can include one or more sensors that are configured to detect information about the environment in which the vehicle operates. One such sensor is a light detection and ranging (LIDAR) device.

A LIDAR device can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a light detection and ranging (LIDAR) device includes a light source that emits light having a wavelength with a wavelength range. The LIDAR device also includes a transmit lens that directs the emitted light to define a field-of-view (FOV) of the LIDAR device. The emitted light illuminates a region of an environment within the FOV defined by the transmit lens. The LIDAR device also includes a receive lens that receives light from the environment, and focuses at least a portion of the received light along a predefined optical path. The LIDAR device also includes an array of light detectors positioned along the predefined optical path to intercept and detect focused light from the receive lens. The LIDAR device also includes an offset light detector positioned outside the predefined optical path to intercept and detect light propagating toward the LIDAR device. The LIDAR device also includes a controller that: (i) collects sensor data obtained using the array of light detectors, and (ii) determines whether the collected sensor data includes sensor data associated with another light source different than the light source of the LIDAR device based on at least output from the offset light detector.

In another example, a method involves emitting light having a wavelength within a wavelength range via a light source of a LIDAR device. The method also involves directing the emitted light via a transmit lens to define a field-of-view (FOV) of the LIDAR device. The emitted light may illuminate a region of an environment within the FOV defined by the transmit lens. The method also involves focusing light from the environment incident on a receive lens. At least a portion of the focused light may be focused along a predefined optical path. The method also involves detecting focused light from the receive lens at an array of light detectors positioned along the predefined path. The method also involves detecting light propagating toward the LIDAR device at an offset light detector positioned outside the predefined optical path. The method also involves collecting sensor data obtained using the array of light detectors. The method also involves determining whether the collected sensor data includes sensor data associated with another light source different than the light source of the LIDAR device based on the light detected at the offset light detector.

In yet another example, a system comprises a LIDAR transmitter, a LIDAR receiver, one or more processors, and data storage. The LIDAR transmitter includes a light source that emits light having a wavelength within a wavelength range. The LIDAR transmitter also includes a transmit lens that directs the emitted light to define a field-of-view (FOV) of the LIDAR transmitter. The emitted light illuminates a region of an environment within the FOV defined by the transmit lens. The LIDAR receiver includes a receive lens that receives light from the environment. The receive lens focuses at least a portion of the received light along a predefined optical path. The LIDAR receiver also includes an array of light detectors positioned along the predefined optical path to intercept and detect focused light from the receive lens. The LIDAR receiver also includes an offset light detector positioned outside the predefined optical path to intercept and detect focused light from the received lens. The data storage stores instructions that, when executed by the one or more processors, cause the system to perform operations. The operations comprise collecting sensor data obtained using the array of light detectors. The operations further comprise determining whether the collected sensor data includes sensor data associated with another light source different than the light source of the LIDAR transmitter based on at least output from the offset light detector.

In still another example, a system comprises means for emitting light having a wavelength within a wavelength range via a light source of a LIDAR device. The system also comprises means for directing the emitted light via a transmit lens to define a field-of-view (FOV) of the LIDAR device. The emitted light may illuminate a region of an environment within the FOV defined by the transmit lens. The system also comprises means for focusing light from the environment incident on a receive lens. At least a portion of the focused light may be focused along a predefined optical path. The system also comprises means for detecting focused light from the receive lens at an array of light detectors positioned along the predefined path. The system also comprises means for detecting light propagating toward the LIDAR device at an offset light detector positioned outside the predefined optical path. The system also comprises means for collecting sensor data obtained using the array of light detectors. The system also comprises means for determining whether the collected sensor data includes sensor data associated with another light source different than the light source of the LIDAR device based on the light detected at the offset light detector.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
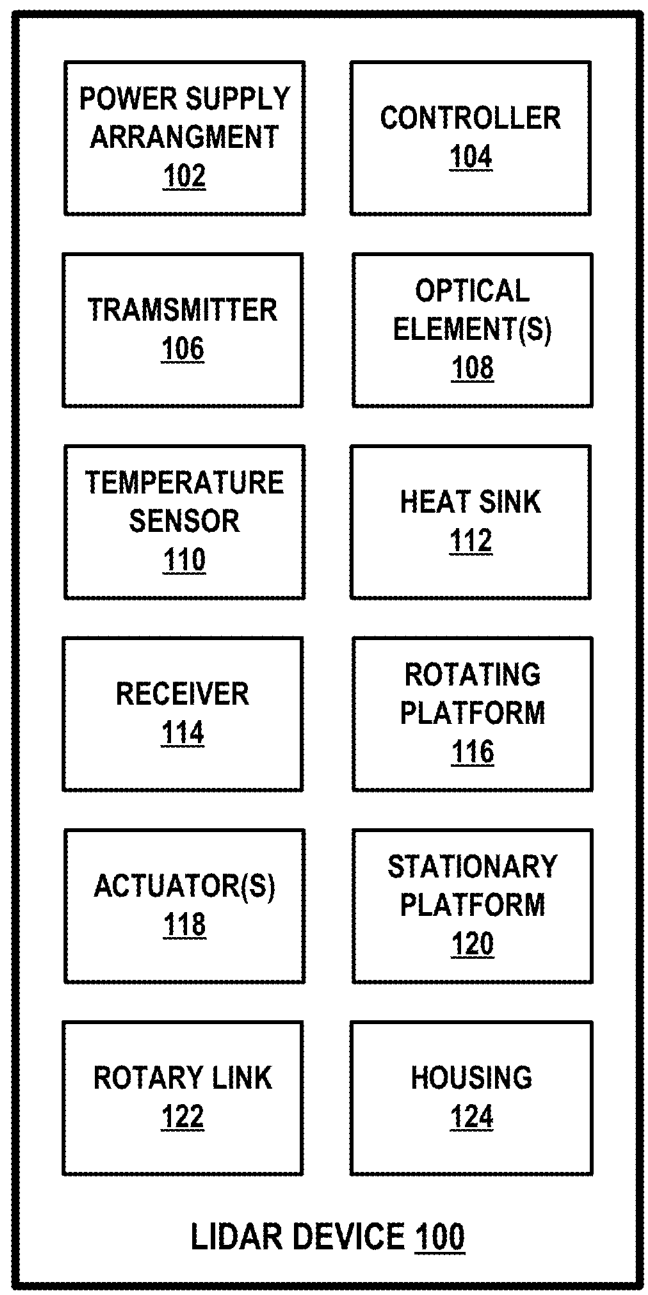
FIG. 1 is a simplified block diagram of a LIDAR device, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. OVERVIEW

There are continued efforts to improve vehicle safety and/or autonomous operation, including the development of vehicles equipped with accident-avoidance systems and remote sensing capabilities. Various sensors, such as a LIDAR device, may be included in a vehicle to detect obstacles or objects in an environment of the vehicle and thereby facilitate accident avoidance and/or autonomous operation, among other options.

In some situations, external light (e.g., originated at a light source other than that of the LIDAR device) may be intentionally or unintentionally emitted towards the LIDAR device, which may cause various problems. The external light, for instance, may originate from another LIDAR device mounted on another vehicle, or may originate from any other external light source (e.g., laser pointer, etc.), among other possibilities. Further, for example, the external light may be of a sufficiently high intensity to damage the LIDAR device if it enters the LIDAR device's optical path. In another example, if the external light enters the optical path, the external light may cause the LIDAR device to generate false data points. In this example, a control system (e.g., a vehicle's control system) evaluating data from the LIDAR device may thus erroneously determine that the false data points are indicative of presence of an object in the environment that is in fact not present in the environment.

In an effort to avoid such problems, disclosed herein are methods and systems that can help protect the LIDAR device against external light that is originated at a light source other than the light source of the LIDAR device and that is being emitted towards the LIDAR device. To that end, one example mitigation procedure may involve a control system operating a LIDAR device (e.g., continuously or from time-to-time) to protect against external light and determining whether or not such external light is actually being emitted towards the LIDAR device. In this way, the control system may take steps to protect operation of the LIDAR device against external light.

In some examples, a LIDAR device may include an off-axis receiver that detects light from region(s) of a surrounding environment other than a region illuminated by the LIDAR device. If the LIDAR device detects external light (via the off-axis receiver) that has similar optical characteristics to optical characteristics of light emitted by the LIDAR device, then the LIDAR device (or the control system) could: (i) modify sensor data collected by the LIDAR device (e.g., to exclude data that may be associated with the external light source, etc.), (ii) modify a mechanical operation of the LIDAR device (e.g., activate a shutter that blocks light from entering the LIDAR device when the LIDAR device is pointing toward the external light source, and/or (iii) modify other operations of the LIDAR device (e.g., adjust a modulation scheme, wavelength, etc., of the light emitted by the LIDAR device to differentiate the emitted light from the external light), among other possibilities.

Thus, within examples, a LIDAR device is described that includes a LIDAR transmitter, a LIDAR receiver, an offset receiver, and a controller. The LIDAR transmitter may include a light source that emits light having particular optical characteristics (e.g., modulation, wavelength(s), etc.) toward a surrounding environment. In one implementation, the light source comprises a fiber laser configured to emit high-intensity laser pulses. Further, in this implementation, the fiber laser can be coupled to a collimator that collimates the emitted laser pulses. The LIDAR transmitter may also include a transmit lens that directs the emitted light to define a field-of-view (FOV) of the LIDAR device. In one implementation, the transmit lens may direct the emitted light along the FOV having predefined vertical and horizontal extents.

The LIDAR receiver may include a receive lens that receives light from the environment propagating toward the LIDAR device. Further, for instance, the transmit lens and the receive lens can be aligned (e.g., according to a LIDAR viewing axis in the FOV of the LIDAR device, etc.) such that the received light includes reflection(s) of the emitted light from one or more objects illuminated by the emitted light. As such, the receive lens may focus at least a portion of the received light along a predefined optical path based on the focused at least portion of the received light propagating from the illuminated region of the environment. For instance, respective lens characteristics (e.g., focal number, orientation, etc.) of the receive lens and the transmit lens can be configured such that reflections of the emitted light incident on the receive lens are focused along the predefined optical path behind the receive lens toward a particular area in a focal plane (and/or an image plane) of the receive lens. However, light incident on the receive lens from a different region of the environment (i.e., a region not illuminated by the emitted light) may be focused along a different optical path toward a different area in the focal plane.

The LIDAR receiver may also include an array of light detectors positioned along the predefined optical path to intercept and detect focused light from the receive lens. Example light detectors include photodiodes, photodetectors, avalanche photodiodes, single photon avalanche photodiodes (SPADs), among others. In some implementations, the receive lens can be coupled to one or more optical elements (e.g., light filters, apertures, etc.) that allow light having the particular optical characteristics of the emitted light to propagate toward the array of light detectors while preventing light having different optical characteristics (e.g., wavelength(s), etendue, polarization, temporal waveform, etc.) from propagating toward the array of light detectors. In some implementations, the LIDAR receiver may also include a receiver housing coupled to the receive lens. The receiver housing may include an opaque material that prevents external light (incident on the LIDAR receiver) other than light focused by the receive lens from propagating toward the array of light detectors. Thus, in these implementations, the array of light detectors can be disposed inside the receiver housing.

The offset light detector may have a similar physical implementation as any of the light detectors in the array of light detectors (e.g., photodiode, SPAD, etc.). However, the offset light detector can be aligned (e.g., positioned, oriented, etc.) in an off-axis alignment relative to the viewing axis of the LIDAR device. For instance, the offset light detector can be positioned outside the predefined optical path to intercept and detect light propagating toward the LIDAR device from a region of the environment other than the region illuminated by the emitted light from the LIDAR transmitter. In some implementations, the light detected at the offset light detector may include light focused by the receive lens along a different optical path than the predefined optical path. For example, where the array of light detectors is disposed inside a receiver housing, the offset light detector can also be disposed inside the receiver housing. In other implementations, the offset light detector can be disposed outside the LIDAR receiver (i.e., outside the receiver housing) and arranged to receive light arriving from a different region than the illuminated region (e.g., off-axis alignment).

The controller of the LIDAR device can be implemented as one or more processor and program instructions executable by the one or more processors to operate the LIDAR device. Alternatively, the controller can be implemented as analog and/or digital circuitry wired to perform the various functions of the LIDAR device.

As an example operation, the controller can be configured to collect sensor data obtained using the array of light detectors of the LIDAR receiver. For instance, the array of light detectors can be proximally arranged (e.g., adjacent to one another, etc.), such that each light detector detects a respective portion of the focused light from the illuminated scene and responsively provides a respective detection signal to the controller. The detection signals can then be processed by the controller to generate a plurality of points in a data cloud of points representing a scanned region of the environment. To that end, for instance, the position of each point in the data cloud can be determined based on a time delay between the emitted light pulse and the detection signal, and/or a light intensity of the detected signal, among other possibilities. Thus, in this instance, each light detector may correspond to a receiver channel mapped to a respective portion of the illuminated region of the environment.

As another example operation, the controller can be configured to determine whether the collected sensor data includes sensor data associated with another light source different than the light source of the LIDAR transmitter. For example, the controller can monitor outputs from the offset LIDAR detector, and determine if the monitored outputs indicate detection (by the offset light detector) of light (i) arriving from a region of the environment that is not illuminated by the LIDAR transmitter and (ii) having similar optical characteristics (e.g., modulation, wavelength, etc.) as the emitted light.

In this case, the controller can then perform one or more of the various mitigation procedures noted above. In one example, the controller can identify a subset of the collected sensor data that may be prone to errors due to interference from the external light source. The controller can then modify the collected sensor data to exclude or otherwise adjust the potentially error-prone sensor data. In another example, the controller can identify a direction and/or location of the external light (e.g., based on a position, orientation, viewing axis, etc., of the offset light detector), and responsively modify operation of the LIDAR device. For instance, the LIDAR device may be a rotary LIDAR device that rotates to scan different FOVs of the LIDAR device. In this instance, the LIDAR device can temporarily activate a shutter when the FOV overlaps the external light from the external light source, thereby preventing detection of the external light at the array of light detectors. In yet another example, the controller can adjust a modulation of the light emitted by the LIDAR transmitter (e.g., waveform shape, wavelength, etc.) to differentiate the emitted light from the external light. To that end, the controller can also adjust various optical elements (e.g., light filters, spatial or temporal light modulators, polarizers, etc.) along the predefined optical path according to the adjusted modulation.

Other LIDAR device components, features, and operations are possible as well and are described in greater detail within exemplary implementations herein.

II. EXAMPLE SENSORS

Although example sensors described herein include LIDAR sensors, other types of sensors are possible as well. A non-exhaustive list of example sensors that can be employed herein includes radio detection and ranging (RADAR) sensors, sound navigation and ranging (SONAR) sensors, among others. To that end, some example sensors herein may include an active range sensor that emits a signal (e.g., in the form of a sequence of pulses, etc.) based on modulated power provided to the sensor, and then detects reflections of the emitted signal from objects in the surrounding environment.

FIG. 1 is a simplified block diagram of a LIDAR device 100, according to an example embodiment. As shown, LIDAR device 100 includes a power supply arrangement 102, a controller 104, a transmitter 106, one or more optical elements 108, a temperature sensor 110, a heat sink 112, a receiver 114, a rotating platform 116, one or more actuators 118, a stationary platform 120, a rotary link 122, and a housing 124. In other embodiments, LIDAR device 100 may include more, fewer, or different components. Additionally, the components shown may be combined or divided in any number of ways.

Power supply arrangement 102 may be configured to supply, receive, and/or distribute power to various components of LIDAR device 100. To that end, power supply arrangement 102 may include or otherwise take the form of a power source (e.g., battery cells, etc.) disposed within LIDAR device 100 and connected to various components of the LIDAR device 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which LIDAR device 100 is mounted) and to transmit the received power to various components of LIDAR device 100.

Controller 104 may include one or more electronic components and/or systems arranged to facilitate certain operations of LIDAR device 100. Controller 104 may be disposed within LIDAR device 100 in any feasible manner. For instance, controller 104 may be disposed, at least partially, within a central cavity region of rotary link 122.

In some examples, controller 104 may include or otherwise be coupled to wiring used for transfer of control signals to various components of LIDAR device 100 and/or for transfer of data from various components of LIDAR device 100 to controller 104. Generally, the data that controller 104 receives may include sensor data based on detections of light by receiver 114, among other possibilities. Moreover, the control signals sent by controller 104 may operate various components of LIDAR device 100, such as by controlling emission of light by transmitter 106, controlling detection of light by the receiver 114, and/or controlling actuator(s) 118 to rotate rotating platform 116, among other possibilities.

To that end, controller 104 may include one or more processors, data storage, and program instructions (stored in the data storage) executable by the one or more processors to cause LIDAR device 100 to perform the various operations described herein. Additionally or alternatively, the controller may communicate with an external controller or the like (e.g., a computing system arranged in a vehicle to which LIDAR device 100 is mounted) so as to help facilitate transfer of control signals and/or data between the external controller and the various components of LIDAR device 100. Additionally or alternatively, controller 104 may include circuitry wired to perform the various functions described herein.

Transmitter 106 may be configured to transmit light (or some other signal) toward an environment of LIDAR device 100. For example, transmitter 106 may include one or more light sources to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately between 1525 nm and 1565 nm. It is noted that this range is described for exemplary purposes only and is not meant to be limiting.

In some implementations, the light source(s) in transmitter 106 may include a fiber laser coupled to an optical amplifier. In particular, the fiber laser may be a laser in which an active gain medium (i.e., source of optical gain within laser) is in an optical fiber. Moreover, the fiber laser could be arranged in various ways within LIDAR device 100. For instance, the fiber laser could be disposed between rotating platform 116 and receiver 114.

As such, the present disclosure will be generally described herein in the context of a fiber laser being used as a light source in transmitter 106. In some arrangements however, one or more light sources in transmitter 106 may additionally or alternatively include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide a plurality of emitted light beams and/or pulses.

Optical element(s) 108 can be included in or otherwise coupled to transmitter 106 and/or receiver 114. For example, optical element(s) 108 may include a transmit lens arranged to direct light from a light source in transmitter 106 toward the environment. Additionally or alternatively, optical element(s) 108 may include any feasible combination of mirrors, lenses, etc. that can guide propagation of light through physical space and/or to adjust certain characteristics of the emitted light.

In some implementations, optical element(s) 108 may also include a diffuser arranged to spread the emitted light along a vertical axis. In practice, the diffuser may be formed from glass or another material, and may be shaped (e.g., aspherical shape) to spread or otherwise scatter light in a particular manner. In one embodiment, the vertical spread may be a spread of +7° away from a horizontal axis to −18° away from the horizontal axis (e.g., the horizontal axis ideally being parallel to a ground surface in the environment). Moreover, the diffuser may be coupled to a light source in transmitter 106 in any direct or indirect manner, such as by being fused to an output end of a fiber laser for instance.

Thus, this implementation may result in laser beams or the like having a horizontal beam width (e.g., 0.06°) that is significantly narrower than a vertical beam width of the laser beams. Such horizontally-narrow laser beams, for instance, may help avoid interference between beams reflected off a reflective object and beams reflected off a less-reflective object that is horizontally adjacent to the reflective object, which may help LIDAR device 100 distinguish between those objects. Other advantages are also possible.

Temperature sensor 110 may include one or more temperature sensors (e.g., thermistor, thermopile, etc.) arranged to measure a temperature associated with emitted light pulses from transmitter 106. In some implementations, optical element(s) 108 may also include a dichroic mirror arranged to reflect at least a portion of diffused light towards temperature sensor 110. With this implementation, temperature sensor 110 could be arranged to measure energy of the light being emitted towards the environment. Data related to that temperature measurement could be received by controller 104, and then used by controller 104 as basis for facilitating further operations, such as adjustments to intensity of the emitted light for example. In another implementation, temperature sensor 110 can be arranged to measure a temperature of another component of LIDAR device 100, such as a temperature of heat sink 112 for instance. Other implementations are also possible.

Heat sink 112 may include any heat conductor (e.g., aluminum, copper, other metal or metal compound) arranged to conduct heat away from transmitter 106. For example, where transmitter 106 includes a fiber laser light source, the fiber laser may generate heat as a result of amplifying the intensity of light via an optical amplifier. The generated heat may affect operation of various components in LIDAR device 100 (e.g., circuitry, transmitter 106, etc.). As such, heat sink 112 may absorb and/or distribute the generated heat to mitigate the effect of the generated heat on the various components of LIDAR device 100.

Receiver 114 may include one or more photodetectors (e.g., photodiodes, avalanche photodiodes, etc.) that are arranged to intercept and detect reflections of the light pulses emitted by transmitter 106 and reflected from one or more objects in a surrounding environment of LIDAR device 100. To that end, receiver 114 may be configured to detect light having wavelengths in the same wavelength range as the light emitted by transmitter 106 (e.g., 1525 nm to 1565 nm). In this way, LIDAR device 100 may distinguish reflected light pulses originated by LIDAR device 100 from other light in the environment.

In some examples, LIDAR device 100 can select or adjust a vertical scanning resolution thereof by focusing incoming light within a vertical angular range onto a particular receiver. As the vertical FOV increases, for instance, the vertical scanning resolution may decrease. As a specific example, receiver 114 could be arranged to focus incoming light within a vertical FOV of +7° away from a horizontal axis of LIDAR device 100 to −7° away from the horizontal axis. With this arrangement, for example, a vertical scanning resolution of LIDAR device 100 may correspond to 0.067°. The vertical angular scanning resolution can be adjusted by focusing (e.g., via actuating a lens of optical element(s) 108, etc.) a different vertical FOV of the incoming light onto receiver 114. For example, if receiver 114 receives light focused from a vertical FOV from +7° to 0° relative to the horizontal axis (as opposed to a range of +7° to −7°), then the vertical resolution of receiver 114 can be improved from 0.067° to 0.034°.

Additionally or alternatively, in some examples, LIDAR device 100 can select or adjust a horizontal scanning resolution by changing a rate of rotation of LIDAR device 100 and/or adjusting a pulse rate of light pulses emitted by transmitter 106. As a specific example, transmitter 106 can be configured to emit light pulses at a pulse rate of 150,000 light pulses per second. In this example, LIDAR device 100 may be configured to rotate at 15 Hz (i.e., 15 complete 360° rotations per second). As such, receiver 114 can detect light with a 0.036° horizontal angular resolution. The horizontal angular resolution of 0.036° can be adjusted by changing the rate of rotation of LIDAR device 100 or by adjusting the pulse rate. For instance, if LIDAR device 100 is instead rotated at 30 Hz, the horizontal angular resolution may become 0.072°. Alternatively, if transmitter 106 emits the light pulses at a rate of 300,000 light pulses per second while maintaining the rate of rotation of 15 Hz, then the horizontal angular resolution may become 0.018°.

In some examples, receiver 114 may include multiple receivers configured to detect light with different resolutions simultaneously. For example, a first receiver may be configured to detect light with a first resolution and a second receiver may be configured to detect light with a second resolution that is lower than the first resolution. As a specific example, the first receiver could be arranged to receive incoming light within a vertical FOV of +7° away from a horizontal axis of LIDAR device 100 to −7° away from the horizontal axis, and the second receiver could be arranged to receive incoming light within a vertical FOV of −7° to −18°. In this way, the first and second receivers collectively allow for detection of light along a FOV of +7° to −18°, but at different respective vertical resolutions. Continuing with the example above, the first receiver may be configured to detect light with a 0.036° (horizontal)×0.29° (vertical) angular resolution, and the second receiver 112 may be configured to detect light with a 0.036° (horizontal)×0.067° (vertical) angular resolution. Thus, in some examples, the first and second receivers may each have a respective optical arrangement (e.g., optical element(s) 108) that allows the respective receivers to provide the respective resolution and receive the respective FOV as described above. It is noted that these resolutions and FOVs are for exemplary purposes only and are not meant to be limiting.

In some examples, at least one receiver of receiver 114 can be configured as an offset receiver having an off-axis alignment relative to the viewing direction of LIDAR device 100. For example, the offset receiver can be implemented as a light detector that receives light propagating from a region of the environment of LIDAR device 100 other than an illuminated region that is illuminated by transmitter 106. To that end, the offset receiver can detect light having similar optical properties as the emitted light from transmitter 106, and LIDAR device 100 can then monitor such detections to mitigate interference by the detected external light. For example, where LIDAR device 100 is rotated via rotating platform 116, the offset receiver can be configured as a look-ahead sensor that detects the external light prior to rotation of LIDAR device 100 to an orientation where a FOV of other receivers (e.g., on-axis receivers) of receiver 104 overlaps with the external light.

In some implementations, receiver 114 may be coupled to an optical lens (e.g., a "receive lens") of optical elements 108 that is arranged to focus light reflected from one or more objects in the environment of the LIDAR device 100 onto detectors of receiver 114. In this embodiment, the optical lens may have dimensions of approximately 10 cm×5 cm as well as a focal length of approximately 35 cm. Moreover, in some instances, the optical lens may be shaped so as to focus incoming light along a particular vertical FOV as described above (e.g., +7° to −7°). As such, the optical lens (e.g., included in optical element(s) 108) may take on one of various forms (e.g., spherical shaping) without departing from the scope of the present disclosure.

In some implementations, optical elements 108 may also include at least one mirror arranged to fold the optical path between the at least one optical lens and a photodetector array in receiver 114. Each such mirror may be fixed within receiver 114 in any feasible manner. Also, any feasible number of mirrors may be arranged for purposes of folding the optical path. For instance, receiver 114 may also include two or more mirrors arranged to fold the optical path two or more times between the optical lens and the photodetector array. In practice, such folding of the optical path may help reduce the size of the first receiver, among other outcomes.

Furthermore, as noted, receiver 114 may include a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. In one implementation, a photodetector array may include an array of 208 detectors for detecting light within a vertical FOV of −7° to −18° and a photodetector array of 48 detectors for detecting light within a vertical FOV of +7° to −7°. It is noted that this photodetector array is described for exemplary purposes only and is not meant to be limiting.

Additionally, the detectors in the array may take various forms. For example, the detectors may take the form of photodiodes, avalanche photodiodes (e.g., Geiger mode and/or linear mode avalanche photodiodes), single photon avalanche photodiodes (SPADs), phototransistors, cameras, active pixel sensors (APS), charge coupled devices (CCD), cryogenic detectors, and/or any other sensor of light configured to detect focused light having wavelengths in the wavelength range of the emitted light.

Rotating platform 116 may be configured to rotate about an axis. To that end, rotating platform 116 can be formed from any solid material suitable for supporting one or more components mounted thereon. For example, transmitter 106 and receiver 114 may be arranged on rotating platform 116 such that each of these components moves relative to the environment based on rotation of rotating platform 116. In particular, each of these components could be rotated relative to an axis so that LIDAR device 100 may obtain information from various directions. In this manner, a pointing direction of LIDAR device 100 can be adjusted horizontally by actuating the rotating platform 114 to different directions.

In order to rotate platform 116 in this manner, one or more actuators 118 may actuate the rotating platform 114. To that end, actuators 118 may include motors, pneumatic actuators, hydraulic pistons, and/or piezoelectric actuators, among other possibilities.

With this arrangement, controller 104 could operate actuator 118 to rotate rotating platform 116 in various ways so as to obtain information about the environment. In one example, rotating platform 116 could be rotated in either direction. In another example, rotating platform 116 may carry out full revolutions such that LIDAR device 100 provides a 360° horizontal FOV of the environment. Moreover, rotating platform 116 could rotate at various rates so as to cause LIDAR device 100 to scan the environment at various refresh rates. For example, LIDAR device 100 may be configured to have a refresh rate of 15 Hz (e.g., fifteen complete rotations of the LIDAR device 100 per second).

Stationary platform 120 may take on any shape or form and may be configured for coupling to various structures, such as to a top of a vehicle for example. Also, the coupling of the stationary platform may be carried out via any feasible connector arrangement (e.g., bolts and/or screws). In this way, LIDAR device 100 could be coupled to a structure so as to be used for various purposes, such as those described herein.

Rotary link 122 directly or indirectly couples stationary platform 120 to the rotating platform 116. To that end, rotary link 122 may take on any shape, form and material that provides for rotation of rotating platform 116 about an axis relative to the stationary platform 120. For instance, rotary link 122 may take the form of a shaft or the like that rotates based on actuation from actuator 118, thereby transferring mechanical forces from actuator 118 to rotating platform 116. In one implementation, rotary link 122 may have a central cavity in which one or more components of LIDAR device 100 may be disposed.

Housing 124 may take on any shape, form, and material and may be configured to house one or more components of LIDAR device 100. For example, housing 124 can be a dome-shaped housing. Further, for example, housing 124 may be composed of a material that is at least partially non-transparent, which may allow for blocking of at least some light from entering the interior space of the housing 124 and thus help mitigate thermal and noise effects of ambient light on one or more components of LIDAR device 100. It is noted that this housing is for exemplary purposes only and is not meant to be limiting.

In some examples, housing 124 may be coupled to rotating platform 116 such that housing 122 is configured to rotate about the above-mentioned axis based on rotation of rotating platform 116. With this implementation, transmitter 106, receiver 114, and possibly other components of LIDAR device 100 may each be disposed within housing 124. In this manner, transmitter 106 and receiver 114 may rotate along with housing 124 while being disposed within housing 124.

In some examples, one or more components of LIDAR device 100 may have a separate physical housing. For example, receiver 114 may comprise one or more separate housing structures that respectively house an array of light detectors of a respective receiver. It is noted that this arrangement of LIDAR device 100 is described for exemplary purposes only and is not meant to be limiting.

Figure 2A:
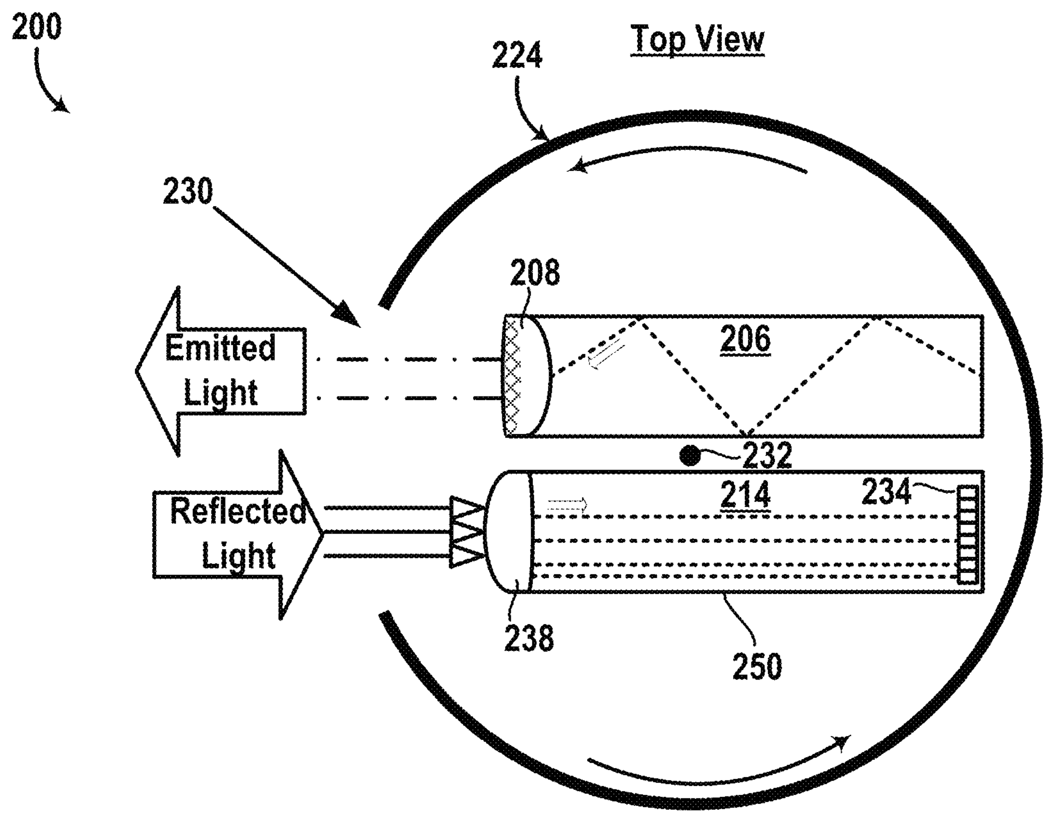
FIG. 2A is a cross-sectional illustration of a top view of a LIDAR device, according to an example embodiment.
Figure 2B:
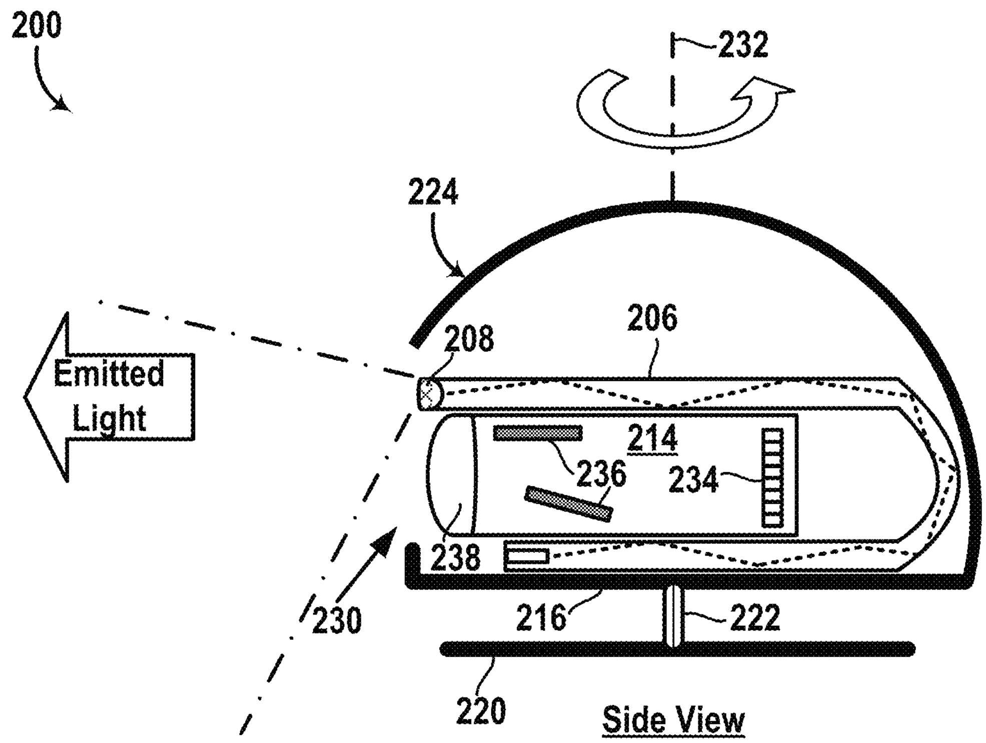
FIG. 2B is a cross-sectional illustration of a side view of the LIDAR device of FIG. 2A.

FIGS. 2A and 2B next show an example set of illustrations of a LIDAR device 200 having the features disclosed herein. In particular, FIG. 2A shows a top cross-sectional view of LIDAR device 200, and FIG. 2B shows a side cross-sectional view of LIDAR device 200. It is noted that these illustrations are shown for exemplary purposes only and are not meant to be limiting.

More specifically, FIGS. 2A and 2B collectively illustrate that LIDAR device 200 includes a housing 224 that is coupled to a rotating platform 216 that may be similar, respectively, to housing 124 and platform 116. Rotating platform 216 is then shown as being coupled to a stationary platform 220 via a rotary link 222, which may be similar, respectively, to stationary platform 120 and rotary link 122. With this arrangement, rotating platform 216 could rotate about axis 232, thereby also causing rotation of a transmitter 206 and a receiver 214, which may be similar, respectively, to transmitter 106 and receiver 114.

As shown, housing 224 also includes an aperture 230 through which light may be emitted into an environment and through which reflected light may be received from the environment. Further, FIGS. 2A and 2B collectively illustrate that transmitter 206 and receiver 214 are disposed within housing 224.

As shown, transmitter 206 includes a transmit lens 208 (e.g., a diffuser), which may be similar to at least one of optical elements 108 for instance, fused with a fiber laser (e.g., "light source") that acts as an optical amplifier, the fiber laser being at least partially positioned between rotating platform 216 and receiver 214. In one example, transmit lens 208 may be arranged to vertically spread the emitted light along a vertical FOV of +7° to −18°.

Further, as shown, receiver 214 includes an optical arrangement (e.g., one or more of optical elements 108) that provides an optical path between a receive lens 238 and a photodetector array 234 (e.g., array of light detectors). Specifically, the optical arrangement is shown to include two mirrors 236 arranged to fold the optical path twice between receive lens 238 and photodetector array 234, thereby helping reduce the size of receiver 214.

Although not shown, transmitter 206 may also include one or more mirrors along a propagation path (shown as dotted lines in FIG. 2B) of the emitted light generated by the fiber laser or other light source of transmitter 206. For example, a dichroic mirror can be placed inside transmitter 106 to allow a portion of the light to propagate towards a temperature sensor (not shown), such as temperature sensor 110 for instance. To that end, the temperature sensor may provide a temperature measurement indicative of an amount of energy transmitted toward lens 208 and toward the environment via the emitted light.

Further, as shown, receiver 214 includes a receiver housing 250 coupled to receive lens 238. Housing 250 is configured to prevent external light (other than light focused by receive lens 238) from propagating toward array 234. To that end, housing 250 may comprise any combination of opaque materials that absorb or reflect external light incident on receiver 214, other than light that is focused by receive lens 238. Thus, for instance, housing 250 can mitigate interference of the external light with signals detected by array 234.

As noted above, some example LIDAR devices described herein may include one or more offset light detectors for detecting light originating from a light source other than the light source of the LIDAR device. In some implementations, the offset light detector can be disposed within housing 250 to detect light focused by lens 238 but propagating along a different optical path than the optical path of the reflected light focused onto array 234. For example, the offset light detector can be disposed proximal to array 234 or in any other position within housing 250.

Figure 3:
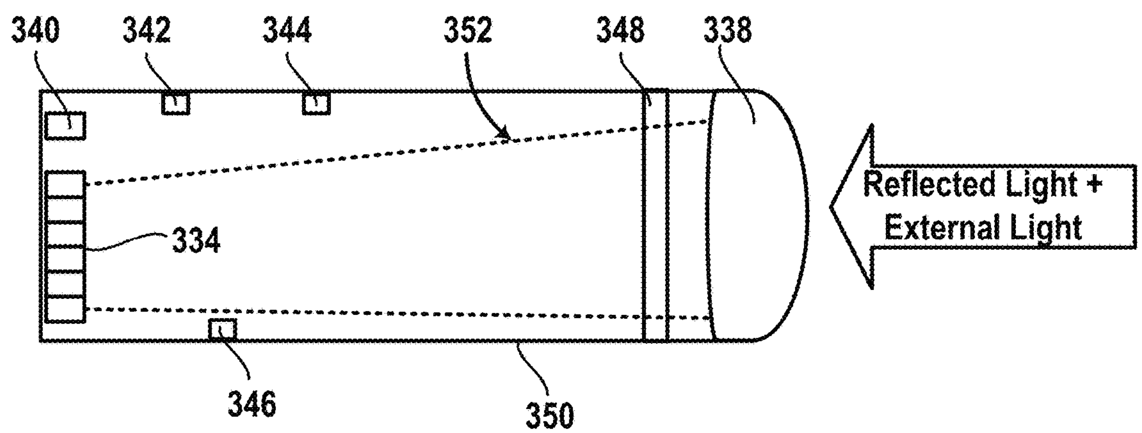
FIG. 3 illustrates a LIDAR receiver that includes offset light detectors disposed within the LIDAR receiver, according to an example embodiment.

FIG. 3 illustrates a LIDAR receiver 314 that includes one or more offset light detectors 340, 342, 344, 346 disposed within the LIDAR receiver 314, according to an example embodiment. LIDAR receiver 314 may be similar to receiver 114 and/or 214. For example, as shown, receiver 314 includes an array of light detectors 334, a receive lens 338, and a receiver housing 350 that are similar, respectively, to photodetector array 234, receive lens 238, and housing 250. Thus, in some examples, receiver 314 can be employed in a LIDAR device (e.g., devices 100, 200, etc.) instead of or in addition to receiver 214.

By way of example, similarly to lens 238, receive lens 338 may receive light from an environment. The received light may include reflected light originating from a LIDAR transmitter (e.g., transmitter 206) as well as external light originating from a different light source (not shown). Further, as shown, receive lens 338 may focus at least a portion of the received light (e.g., reflected light originating from the LIDAR transmitter) along a predefined optical path 352 (extending between the dotted lines shown in FIG. 3). The focused at least portion of the received light may be focused within optical path 352 based on lens characteristics of receive lens 338, alignment of receiver 314 with the LIDAR transmitter (e.g., transmitter 206), and optical characteristics of emitted light by the LIDAR transmitter. For instance, the emitted light may be collimated and diverging (e.g., via transmit lens 208, etc.) in particular directions such that reflections of the emitted light are focused by receive lens 338 along optical path 352 and onto array 334. Whereas, for instance, at least a portion of external light incident on receive lens 338 from a different (unilluminated) region of the environment may be focused along a different optical path (not shown) than predefined optical path 352.

As shown, receiver 314 also includes offset light detectors 340, 342, 344, 346 that are positioned outside predefined optical path 352. Offset light detectors 340, 342, 344, 346 can be physically implemented similarly to light detectors in array 334 (e.g., photodetectors, photodiodes, photo-resistors, avalanche photodiodes, SPADs, etc.). However, as shown, offset light detectors 340, 342, 344, 346 are located at various positions within housing 350 outside predefined optical path 352. With such arrangement, receiver 314 can detect (via offset light detectors 340, 342, 344, and/or 346) external light that may interfere with the signals detected by array 334. As such, a LIDAR device (e.g., devices 100, 200, etc.) and/or a computing system processing sensor data from array 334 can validate/modify the sensor data based on outputs of offset light detectors 340, 342, 344, 352, and/or modify operation of the LIDAR device to account for the external light.

As shown, receiver 314 also includes a light filter 348. Light filter 348 may comprise any optical element configured to selectively allow transmission of light having particular optical characteristics through light filter 348. For example, light filter 348 may be configured to allow light having wavelengths of light emitted by a LIDAR transmitter (e.g., transmitter 206), while preventing light having different wavelengths (e.g., background light, etc.) from propagating toward array 334. By doing so, for instance, filter 348 can prevent exposure of light detectors in array 334 to high intensity light from various light sources in the environment as well as mitigate interference of light sources in the illuminated region of the environment with the emitted light from the LIDAR transmitter (e.g., transmitter 206).

In some examples, light filter 348 may comprise an adjustable light filter. For example, LIDAR device 100 and/or 200 may be configured to modulate the emitted light by a respective LIDAR transmitter therein (e.g., transmitters 106, 206, etc.) to adjust the optical characteristics of the emitted light (e.g., wavelength, etc.). In this example, the LIDAR device can then adjust light filter 348 to selectively allow light having the adjusted optical characteristics according to the modulated emitted light. In one implementation, light filter 348 may comprise multiple light filters for selecting different wavelength ranges, and a LIDAR device may actuate one or more of the light filters to intersect predefined optical path 352 or to move away from optical path 352 depending on the modulation of the emitted light by the LIDAR device. Other implementations are possible as well.

It is noted that the illustrations of the various components of receiver 314 are not meant to be limiting but are illustrated as shown for convenience in description. In one example, receiver 314 may include more or fewer components than shown. For instance, receiver 314 can be alternatively implemented with fewer or more offset light detectors than those shown. In another example, the positions of the various components of receiver 314 may be different than the positions shown. For instance, offset light detectors 340, 342, 344, 346 can be alternatively positioned in other locations or orientations within housing 350 outside predefined optical path 352. In another instance, filter 348 can be alternatively implemented outside receiver 314 (e.g., on an opposite side of lens 338), or can be implemented together with lens 338 as a single structure (e.g., lens 338 can be implemented from material having filtering properties, filter 348 can be implemented as a film disposed along a surface of lens 338, etc.). Other variations are possible as well.

In some implementations, offset light detectors 340, 342, 344, and/or 346 can be alternatively physically implemented separately from receiver 214. Referring back to FIGS. 2A and 2B by way of example, LIDAR device 200 can optionally include an additional receiver (not shown), similar to receiver 214, that is misaligned relative to transmitter 206 to detect light propagating from a region of the environment that is not illuminated by transmitter 206. To that end, such additional receiver may also include a receive lens (not shown) and an array of light detectors (not shown) that are similar, respectively, to receive lens 238 and array 234.

III. EXAMPLE VEHICLES

Some example implementations herein involve a sensor, such as LIDAR devices 100 and/or 200 for instance, mounted to a vehicle. However, an example sensor disclosed herein can also be used for various other purposes and may be incorporated on or otherwise connected to any feasible system or arrangement. For example, an example LIDAR device can be used in an assembly line setting to monitor objects (e.g., products) being manufactured in the assembly line. Other examples are possible as well. Additionally, although illustrative embodiments herein include a LIDAR device mounted on a car, an example LIDAR device may additionally or alternatively be used on any type of vehicle, including conventional automobiles as well as automobiles having an autonomous or semi-autonomous mode of operation. Further, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, etc.

Figure 4:
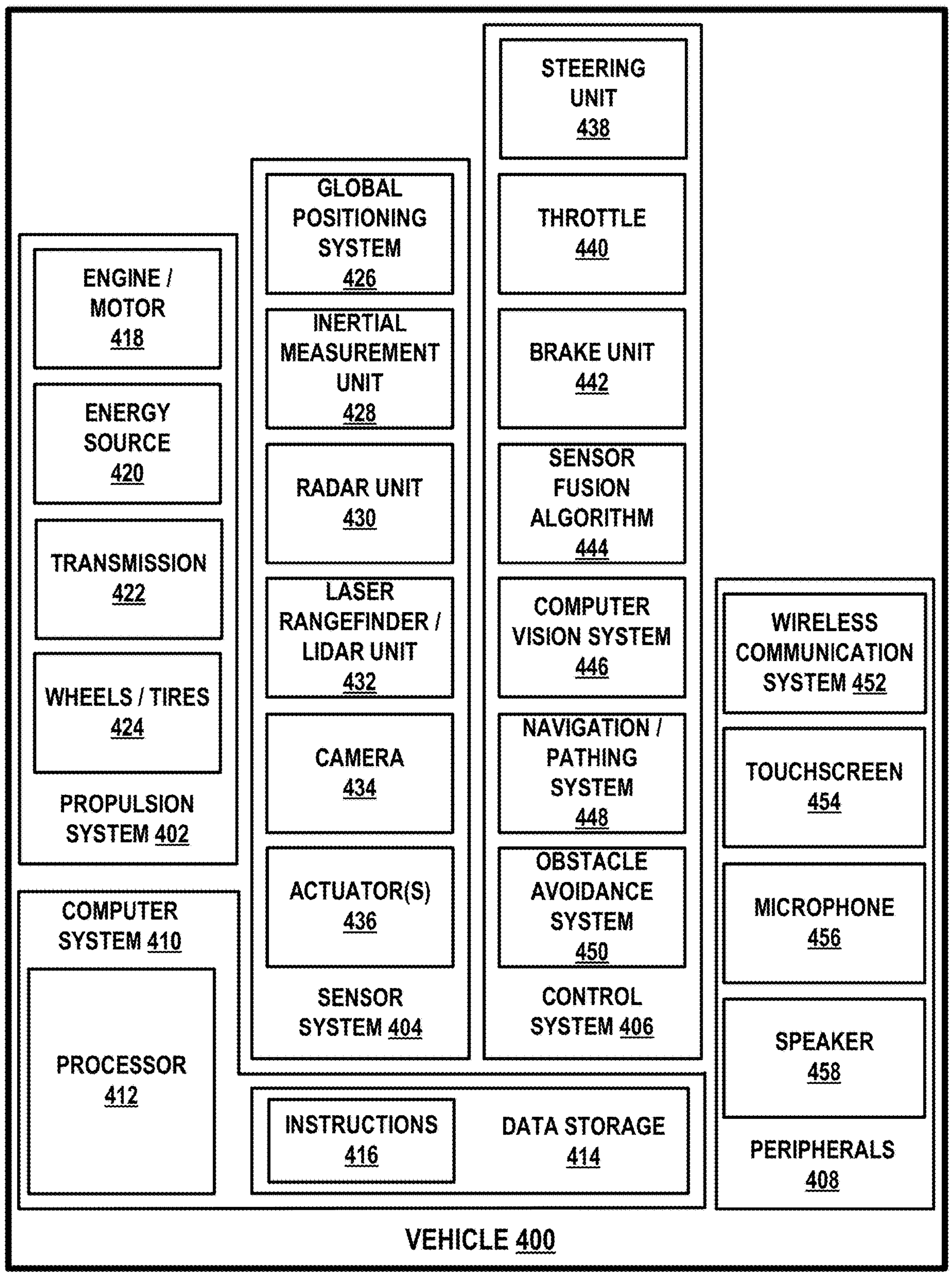
FIG. 4 is a simplified block diagram of a vehicle, according to an example embodiment.

FIG. 4 is a simplified block diagram of a vehicle 400, according to an example embodiment. As shown, the vehicle 400 includes a propulsion system 402, a sensor system 404, a control system 406, peripherals 408, and a computer system 410. In some embodiments, vehicle 400 may include more, fewer, or different systems, and each system may include more, fewer, or different components. Additionally, the systems and components shown may be combined or divided in any number of ways. For instance, control system 406 and computer system 410 may be combined into a single system.

Propulsion system 402 may be configured to provide powered motion for the vehicle 400. To that end, as shown, propulsion system 402 includes an engine/motor 418, an energy source 420, a transmission 422, and wheels/tires 424.

The engine/motor 418 may be or include any combination of an internal combustion engine, an electric motor, a steam engine, and a Sterling engine. Other motors and engines are possible as well. In some embodiments, propulsion system 402 may include multiple types of engines and/or motors. For instance, a gas-electric hybrid car may include a gasoline engine and an electric motor. Other examples are possible.

Energy source 420 may be a source of energy that powers the engine/motor 418 in full or in part. That is, engine/motor 418 may be configured to convert energy source 420 into mechanical energy. Examples of energy sources 420 include gasoline, diesel, propane, other compressed gas-based fuels, ethanol, solar panels, batteries, and other sources of electrical power. Energy source(s) 420 may additionally or alternatively include any combination of fuel tanks, batteries, capacitors, and/or flywheels. In some embodiments, energy source 420 may provide energy for other systems of the vehicle 400 as well. To that end, energy source 420 may additionally or alternatively include, for example, a rechargeable lithium-ion or lead-acid battery. In some embodiments, energy source 420 may include one or more banks of batteries configured to provide the electrical power to the various components of vehicle 400.

Transmission 422 may be configured to transmit mechanical power from the engine/motor 418 to the wheels/tires 424. To that end, transmission 422 may include a gearbox, clutch, differential, drive shafts, and/or other elements. In embodiments where the transmission 422 includes drive shafts, the drive shafts may include one or more axles that are configured to be coupled to the wheels/tires 424.

Wheels/tires 424 of vehicle 400 may be configured in various formats, including a unicycle, bicycle/motorcycle, tricycle, or car/truck four-wheel format. Other wheel/tire formats are possible as well, such as those including six or more wheels. In any case, wheels/tires 424 may be configured to rotate differentially with respect to other wheels/tires 424. In some embodiments, wheels/tires 424 may include at least one wheel that is fixedly attached to the transmission 422 and at least one tire coupled to a rim of the wheel that could make contact with the driving surface. Wheels/tires 424 may include any combination of metal and rubber, or combination of other materials. Propulsion system 402 may additionally or alternatively include components other than those shown.

Sensor system 404 may include a number of sensors configured to sense information about an environment in which the vehicle 400 is located, as well as one or more actuators 436 configured to modify a position and/or orientation of the sensors. As shown, sensor system 404 includes a Global Positioning System (GPS) 426, an inertial measurement unit (IMU) 428, a RADAR unit 430, a laser rangefinder and/or LIDAR unit 432, and a camera 434. Sensor system 404 may include additional sensors as well, including, for example, sensors that monitor internal systems of the vehicle 400 (e.g., an $O_2$ monitor, a fuel gauge, an engine oil temperature, etc.). Other sensors are possible as well.

GPS 426 may be any sensor (e.g., location sensor) configured to estimate a geographic location of vehicle 400. To this end, the GPS 426 may include a transceiver configured to estimate a position of the vehicle 400 with respect to the Earth. IMU 428 may be any combination of sensors configured to sense position and orientation changes of the vehicle 400 based on inertial acceleration. In some embodiments, the combination of sensors may include, for example, accelerometers, gyroscopes, etc. RADAR unit 430 may be any sensor configured to sense objects in the environment in which the vehicle 400 is located using radio signals. In some embodiments, in addition to sensing the objects, RADAR unit 430 may additionally be configured to sense the speed and/or heading of the objects. Similarly, laser range finder or LIDAR unit 432 may be any sensor configured to sense objects in the environment in which vehicle 400 is located using lasers. For example, LIDAR unit 432 may include one or more LIDAR devices, at least some of which may take the form of LIDAR devices 100 and/or 200 for instance. Camera 434 may be any camera (e.g., a still camera, a video camera, etc.) configured to capture images of the environment in which the vehicle 400 is located. To that end, camera 434 may take any of the forms described above.

Control system 406 may be configured to control one or more operations of vehicle 400 and/or components thereof. To that end, control system 406 may include a steering unit 438, a throttle 440, a brake unit 442, a sensor fusion algorithm 444, a computer vision system 446, navigation or pathing system 448, and an obstacle avoidance system 450.

Steering unit 438 may be any combination of mechanisms configured to adjust the heading of vehicle 400. Throttle 440 may be any combination of mechanisms configured to control engine/motor 418 and, in turn, the speed of vehicle 400. Brake unit 442 may be any combination of mechanisms configured to decelerate vehicle 400. For example, brake unit 442 may use friction to slow wheels/tires 424. As another example, brake unit 442 may convert kinetic energy of wheels/tires 424 to an electric current.

Sensor fusion algorithm 444 may be an algorithm (or a computer program product storing an algorithm) configured to accept data from sensor system 404 as an input. The data may include, for example, data representing information sensed by sensor system 404. Sensor fusion algorithm 444 may include, for example, a Kalman filter, a Bayesian network, an algorithm for some of the functions of the methods herein, or any another algorithm. Sensor fusion algorithm 444 may further be configured to provide various assessments based on the data from sensor system 404, including, for example, evaluations of individual objects and/or features in the environment in which vehicle 400 is located, evaluations of particular situations, and/or evaluations of possible impacts based on particular situations. Other assessments are possible as well.

Computer vision system 446 may be any system configured to process and analyze images captured by camera 434 in order to identify objects and/or features in the environment in which vehicle 400 is located, including, for example, traffic signals and obstacles. To that end, computer vision system 446 may use an object recognition algorithm, a Structure from Motion (SFM) algorithm, video tracking, or other computer vision techniques. In some embodiments, computer vision system 446 may additionally be configured to map the environment, track objects, estimate the speed of objects, etc.

Navigation and pathing system 448 may be any system configured to determine a driving path for vehicle 400. Navigation and pathing system 448 may additionally be configured to update a driving path of vehicle 400 dynamically while vehicle 400 is in operation. In some embodiments, navigation and pathing system 448 may be configured to incorporate data from sensor fusion algorithm 444, GPS 426, LIDAR unit 432, and/or one or more predetermined maps so as to determine a driving path for vehicle 400. Obstacle avoidance system 450 may be any system configured to identify, evaluate, and avoid or otherwise negotiate obstacles in the environment in which vehicle 400 is located. Control system 406 may additionally or alternatively include components other than those shown.

Peripherals 408 may be configured to allow vehicle 400 to interact with external sensors, other vehicles, external computing devices, and/or a user. To that end, peripherals 408 may include, for example, a wireless communication system 452, a touchscreen 454, a microphone 456, and/or a speaker 458.

Wireless communication system 452 may be any system configured to wirelessly couple to one or more other vehicles, sensors, or other entities, either directly or via a communication network. To that end, wireless communication system 452 may include an antenna and a chipset for communicating with the other vehicles, sensors, servers, or other entities either directly or via a communication network. The chipset or wireless communication system 452 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 454 may be used by a user to input commands to vehicle 400. To that end, touchscreen 454 may be configured to sense at least one of a position and a movement of a user's finger via capacitive sensing, resistance sensing, or a surface acoustic wave process, among other possibilities. Touchscreen 454 may be capable of sensing finger movement in a direction parallel or planar to the touchscreen surface, in a direction normal to the touchscreen surface, or both, and may also be capable of sensing a level of pressure applied to the touchscreen surface. Touchscreen 454 may be formed of one or more translucent or transparent insulating layers and one or more translucent or transparent conducting layers. Touchscreen 454 may take other forms as well. Microphone 456 may be configured to receive audio (e.g., a voice command or other audio input) from a user of vehicle 400. Similarly, speakers 458 may be configured to output audio to the user.

Computer system 410 may be configured to transmit data to, receive data from, interact with, and/or control one or more of propulsion system 402, sensor system 404, control system 406, and peripherals 408. To this end, computer system 410 may be communicatively linked to one or more of propulsion system 402, sensor system 404, control system 406, and peripherals 408 by a system bus, network, and/or other connection mechanism (not shown).

In one example, computer system 410 may be configured to control operation of transmission 422 to improve fuel efficiency. As another example, computer system 410 may be configured to cause camera 434 to capture images of the environment. As yet another example, computer system 410 may be configured to store and execute instructions corresponding to sensor fusion algorithm 444. As still another example, computer system 410 may be configured to store and execute instructions for determining a 3D representation of the environment around vehicle 400 using LIDAR unit 432. Other examples are possible as well. Thus, for instance, computer system 410 could function as a controller for LIDAR unit 432.

As shown, computer system 410 includes processor 412 and data storage 414. Processor 412 may comprise one or more general-purpose processors and/or one or more special-purpose processors. To the extent that processor 412 includes more than one processor, such processors could work separately or in combination. Data storage 414, in turn, may comprise one or more volatile and/or one or more non-volatile storage components, such as optical, magnetic, and/or organic storage, and data storage 414 may be integrated in whole or in part with processor 412.

In some embodiments, data storage 414 may contain instructions 416 (e.g., program logic) executable by processor 412 to cause vehicle 400 and/or components thereof (e.g., LIDAR unit 432, etc.) to perform the various operations described herein. Data storage 414 may contain additional instructions as well, including instructions to transmit data to, receive data from, interact with, and/or control one or more of propulsion system 402, sensor system 404, control system 406, and/or peripherals 408.

In some embodiments, vehicle 400 may include one or more elements in addition to or instead of those shown. For example, vehicle 400 may include one or more additional interfaces and/or power supplies. Other additional components are possible as well. In such embodiments, data storage 414 may also include instructions executable by processor 412 to control and/or communicate with the additional components. Still further, while each of the components and systems are shown to be integrated in vehicle 400, in some embodiments, one or more components or systems may be removably mounted on or otherwise connected (mechanically or electrically) to vehicle 400 using wired or wireless connections. Vehicle 400 may take other forms as well.

Figure 5A:
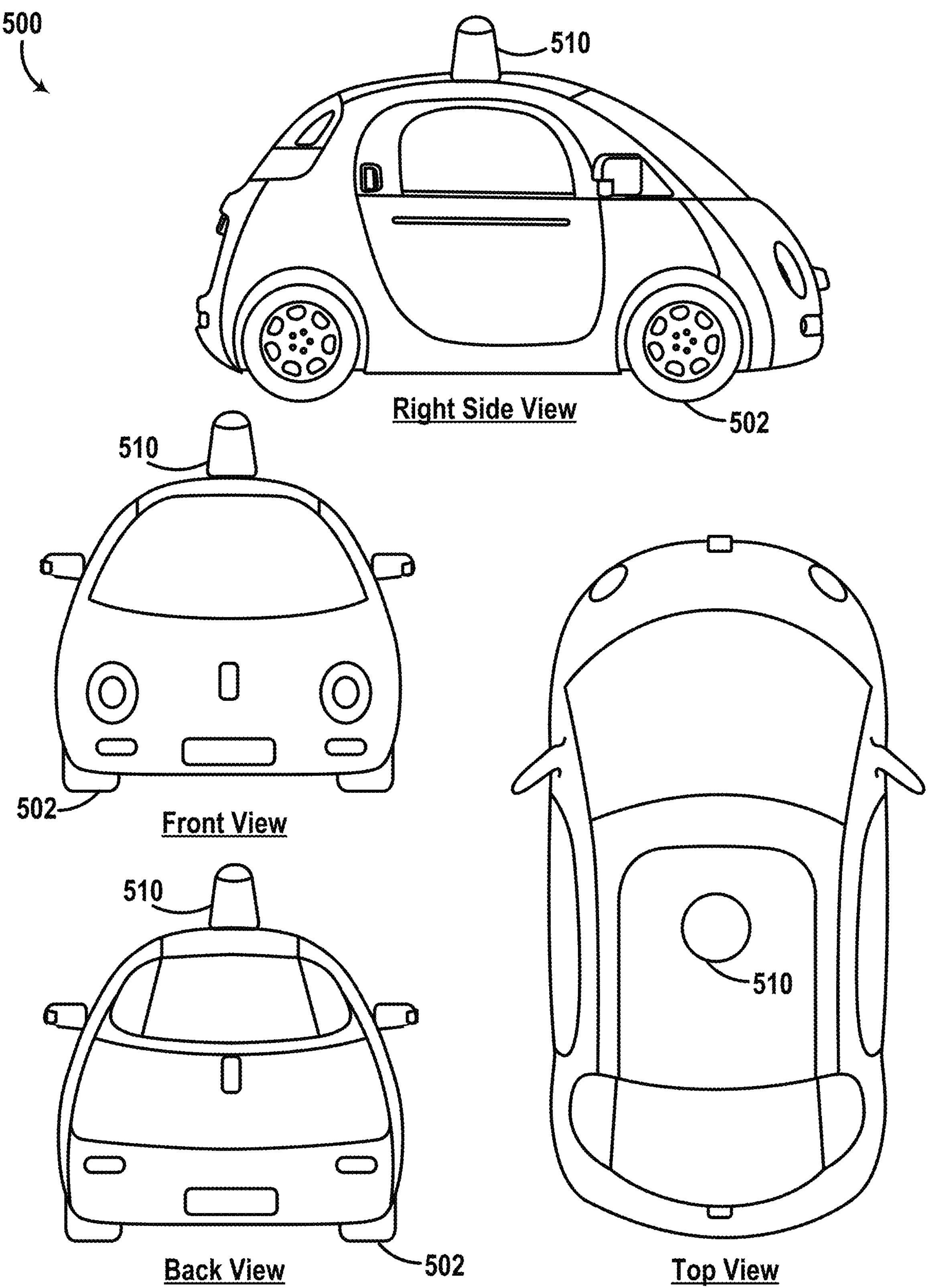
FIG. 5A illustrates several views of a vehicle equipped with a LIDAR device, according to an example embodiment.
Figure 5B:
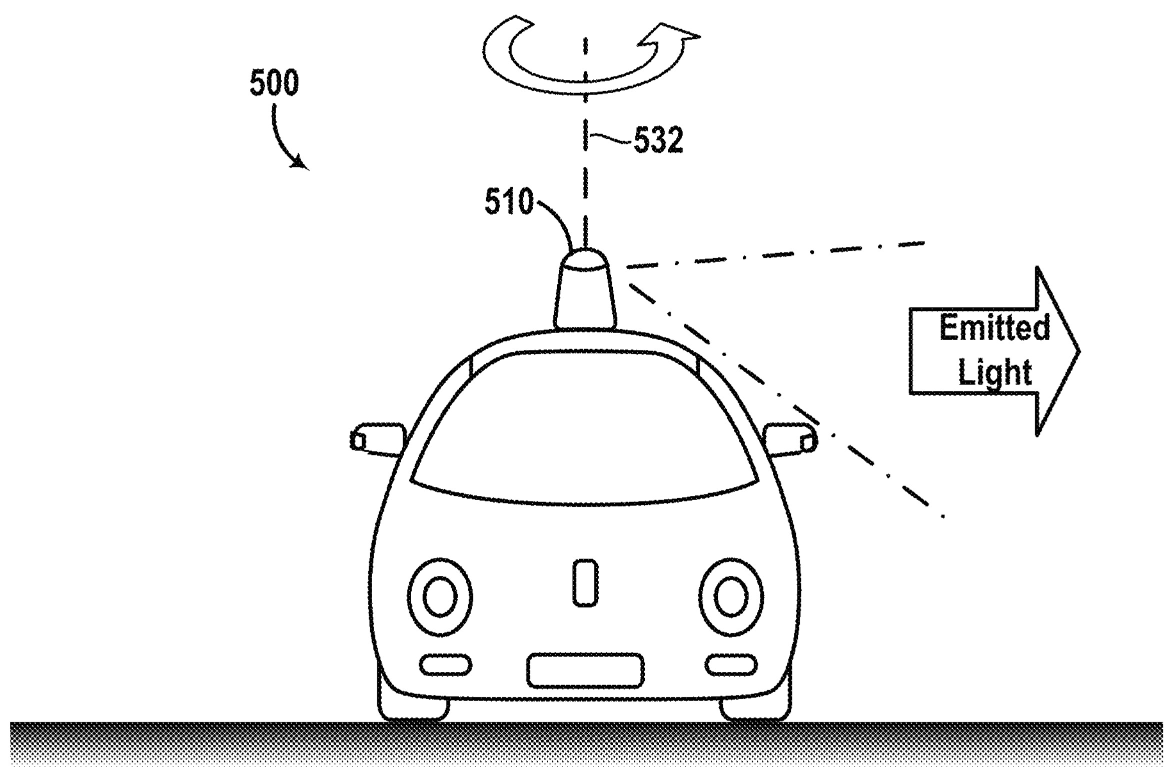
FIG. 5B illustrates an example operation of the LIDAR device.

FIGS. 5A and 5B collectively illustrate a vehicle 500 equipped with a LIDAR device 510, according to example embodiments. Vehicle 500 may be similar to vehicle 400, for example. Although vehicle 500 is illustrated as a car, as noted above, other types of vehicles are possible. Furthermore, although vehicle 500 is shown as a vehicle that may be configured to operate in autonomous mode, the embodiments described herein are also applicable to vehicles that are not configured to operate autonomously.

FIG. 5A shows a Right Side View, Front View, Back View, and Top View of vehicle 500. As shown, vehicle 500 includes LIDAR device 510 mounted on a top side of vehicle 500 opposite a bottom side on which wheels of vehicle 500, exemplified by wheel 502, are located. LIDAR device 510 may be similar to LIDAR devices 100 and/or 200, for example. Although LIDAR device 510 is shown and described as being positioned on a top side of vehicle 500, LIDAR device 510 could be alternatively positioned on any other part of vehicle 500, including any other side of vehicle 500 and/or inside vehicle 500 for instance.

FIG. 5B next shows that LIDAR device 510 may be configured to scan an environment around vehicle 500 by rotating about vertical axis 532, which may be similar to axis 232 for instance, while emitting one or more light pulses and detecting reflected light pulses off objects in an environment of vehicle 500, for example.

Thus, as shown, LIDAR device 510 may emit light in a pointing direction of LIDAR 510, which is shown in FIG. 5B as a pointing direction toward a right side of the page for example. With this arrangement, LIDAR device 510 can emit light toward regions of the environment that are relatively close to the vehicle (e.g., a lane marker) as well as toward regions of the environment that are further away from the vehicle (e.g., a road sign ahead of the vehicle). Further, vehicle 500 can rotate LIDAR device 510 (or one or more components thereof) about axis 532 to change the pointing direction of LIDAR device 510. Thus, for each complete rotation of LIDAR device 510 (or one or more components thereof), LIDAR device 510 can scan a 360° horizontal FOV around vehicle 500.

IV. EXAMPLE METHODS

Figure 6:
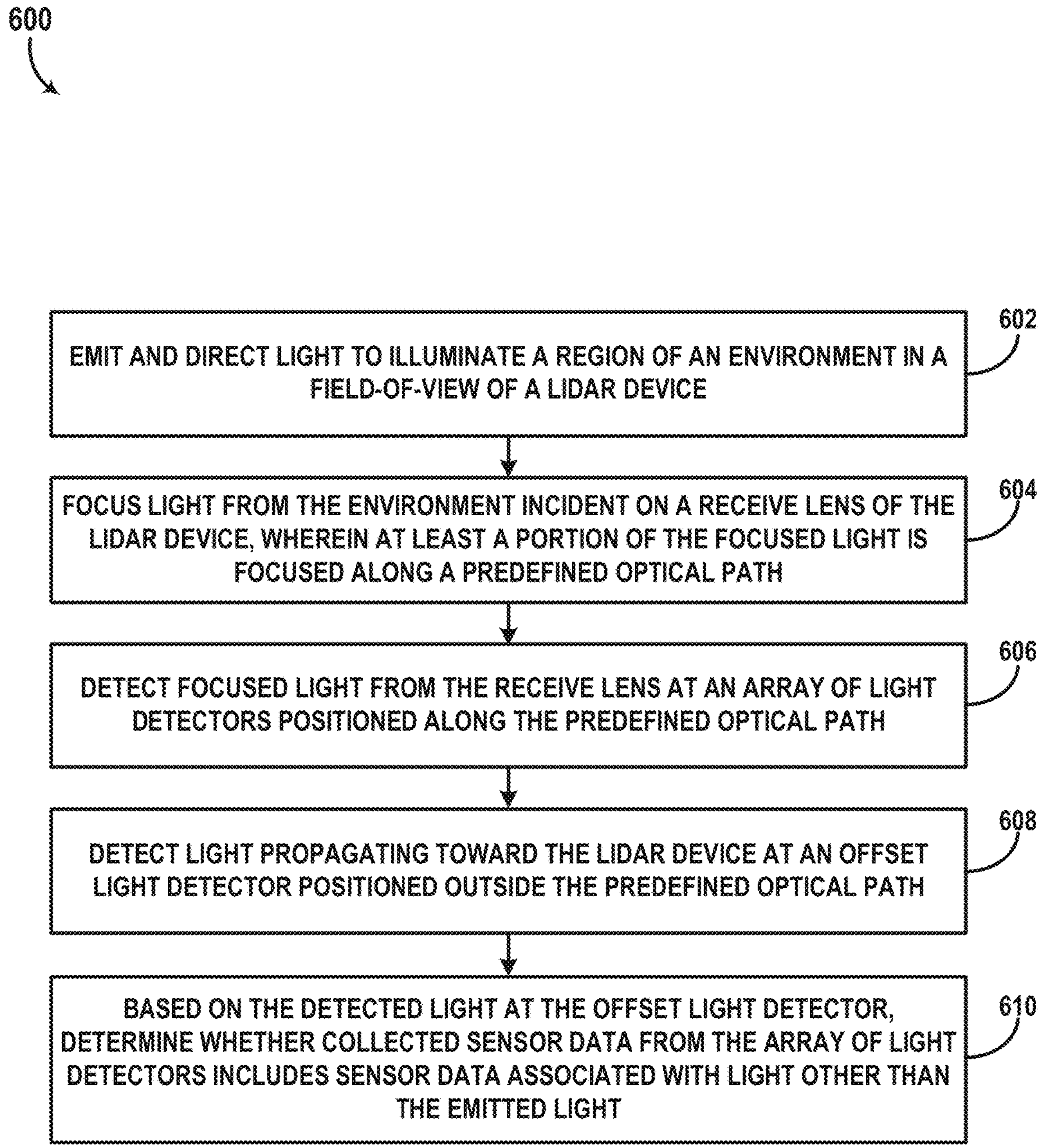
FIG. 6 is a flowchart of a method, according to an example embodiment.

FIG. 6 is a flowchart of a method 600, according to example embodiments. Method 600 presents an embodiment of a method that could be used with any of LIDAR devices 100, 200, LIDAR receiver 314, and/or vehicles 400, 500, for example. Method 600 may include one or more operations, functions, or actions as illustrated by one or more of blocks 602-610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 600 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 600 and other processes and methods disclosed herein, each block in FIG. 6 may represent circuitry that is wired to perform the specific logical functions in the process.

Thus, in various examples, the functions of method 600 can be implemented using controller 104, computer system 410, and/or control system 406. Further, in some examples, the various functions of method 600 can be implemented by a combination of one or more of these components. For example, the various functions of method 700 can be distributed between controller 104 and computer system 410, among other possibilities.

At block 602, method 600 involves emitting and directing light to illuminate a region of an environment in a field-of-view (FOV) of a LIDAR device. For example, a light source (e.g., fiber laser, etc.) of LIDAR transmitter 206 can emit light pulses and/or beams toward a surrounding environment of LIDAR device 200. Further, transmit lens 208 can collimate and diverge the emitted light to define the FOV (e.g., 0.06° or 1 mrad horizontally, and +7° to −18° vertically, etc.) of the LIDAR device. Other FOVs are possible as well. As such, the illuminated region of the environment may correspond to a region along a pointing direction of the LIDAR device that extends horizontally and vertically within the extents of the FOV.

At block 604, method 600 involves focusing light from the environment incident on a receive lens of the LIDAR device. At least a portion of the focused light is focused along a predefined optical path. At block 606, method 600 involves detecting focused light from the receive lens at an array of light detectors positioned along the predefined optical path. For example, receive lens 338 of LIDAR receiver 314 can focus at least a portion of light incident thereon along predefined optical path 352 toward array of light detectors 334. The at least portion of the focused light within optical path 352 may correspond to light originating from the illuminated region of the surrounding environment (e.g., based on the alignment of receive lens 338 with transmit lens 208, etc.).

At block 608, method 600 involves detecting light propagating toward the LIDAR device at an offset light detector positioned outside the predefined optical path. In one example, the offset light detector may be a light detector within a LIDAR receiver that includes the array of light detectors (e.g., light detector 340, 342, 344, or 346). In another example, the offset light detector may be a light detector separate from the LIDAR receiver (e.g., disposed along an outer surface of housing 224, disposed in a separate off-axis receiver within housing 224 (not shown in FIGS. 2A and 2B), etc.).

At block 610, method 600 involves determining whether collected sensor data from the array of light detectors includes sensor data associated with light other than the emitted light. The determination at block 610 may be based on the light detected at the offset light detector (i.e., at block 608).

In one example scenario, external light incident on the LIDAR device may have similar optical characteristics (e.g., waveform shape, light pulse duration, wavelength, etc.) as the emitted light at block 602. To that end, for instance, the external light may be emitted by another LIDAR device (e.g., on another vehicle, etc.). In another instance, the external light may be emitted by a spoofing device that monitors light emitted by the LIDAR device toward the spoofing device and simulates a similar light pattern toward the LIDAR device rotates back toward the spoofing device. In either case, the offset light detector can be employed to detect the external light.

Referring back to FIG. 3 for example, offset light detector 340 can be positioned proximal to array 334 and/or proximal to predefined optical path 352. With this arrangement, if the external light has a different horizontal beam width (e.g., more than 0.06°, etc.) than that of the emitted light, then offset light detector 340 can detect a portion of the external light simultaneously with detection by one or more light detectors of array 334. A system of method 300 (e.g., controller 104, computing system 410, etc.) may then determine that the collected sensor data (at array 334) coinciding with the detection at offset light detector 340 may potentially indicate detection of external light as reflected light originating from the LIDAR device. In this case, the system can thus modify the collected sensor data (at least for a time frame where offset light detector 340 was triggered) in order to remove or reduce data that may be potentially erroneous (i.e., associated with the external light).

As a variation of the example above, offset light detectors 342, 344, and/or 346 can be positioned in predetermined locations associated with particular directions of light focused by lens 338. For instance, detector 344 may detect light that originates form an external light source +5° (horizontally) away from a pointing direction of the LIDAR device. Thus, in this example, offset light detector 344 can be configured as a look-ahead sensor that detects such external light prior to rotation of the LIDAR device to a pointing direction that corresponds to the position of the external light source. As such, an example system may exclude or remove sensor data collected (at array 334) when the LIDAR device becomes aligned with the previously detected external light source. Alternatively, the system can adjust a modulation of the emitted light at block 602 to differentiate the emitted light from the detected light at the offset light detector.

In another example scenario, the external light detected at the offset light detector may have sufficiently different optical characteristics that can be identified in the sensor data collected at the array of light detectors. For example, the external light may have a relatively low light intensity, a different waveform shape, different light pulse duration, different light beam size, etc. Thus, the system may modify the collected sensor data to remove data indicating light having the optical characteristics detected via the offset detector.

Thus, in some implementations, the determination at block 610 may involve comparing optical characteristics of light detected by the offset light detector to optical characteristics of light emitted by a light source of the LIDAR device (e.g., at block 602). Additionally, in some implementations, method 600 may also involve modifying the collected sensor data (at block 608) in response to the comparison indicating a match between the optical characteristics of the light detected by the offset light detector and the optical characteristics of the light emitted by the light source of the LIDAR device.

Other mitigation procedures are possible. In some implementations, method 600 may also involve selecting a sensor different than the LIDAR device for scanning the illuminated region in response to a determination that the collected sensor data from the array of light detectors includes sensor data associated with light other than the emitted light. For example, vehicle 400 can use data from camera 434, radar unit 430, and/or another sensor of sensor system 404 instead of the LIDAR device to scan the region of the environment where interference is expected.

Alternatively or additionally, in some implementations, method 600 may also involve modifying a navigation operation of a vehicle that includes the sensor (e.g., the LIDAR device) in response to a determination that the collected sensor data from the array of light detectors includes sensor data associated with light other than the emitted light. For example, vehicle 400 may enter a safety navigation mode (in response to the determination) that causes the vehicle to park on the side of the road or otherwise change its navigational path to reduce or mitigate the interference with the LIDAR device.

In some implementations, method 600 also involves determining a three-dimensional (3D) representation of the environment based on at least the collected sensor data (at block 610) and output from the offset light detector (e.g., detected at block 608). For example, the LIDAR device can be mounted on a rotating platform that rotates to adjust the FOV of the LIDAR device, thereby allowing the LIDAR device to scan a 360° view of the surrounding environment. To that end, collecting the sensor data at block 610 may involve collecting sensor data for a plurality of FOVs of the LIDAR device. Computing system 410 (and/or controller 104) can then combine collected sensor data associated with the various FOVs. Next, computing system 410 can modify the combined sensor data to remove a subset of the collected data associated with external light sources based on detections of the offset light detectors. Next, computing system 410 (e.g., via sensor fusion algorithm 444, etc.) can use the combined and modified sensor data to build a data cloud or other 3D model of the surrounding environment.

In accordance with the present disclosure, a control system (e.g., controller 104, computing system 410, control system 406, etc.) may be configured to engage in a mitigation procedure to protect a LIDAR device from external light sources. In particular, the mitigation procedure may involve a control system carrying out one or more operations to protect the LIDAR device against external light and doing so specifically in response to detecting that external light (via an offset light detector) is being emitted towards the LIDAR device. In this way, the control system may ensure that mitigation features are in place to protect operation of the LIDAR device against external light sources.

Figure 7:
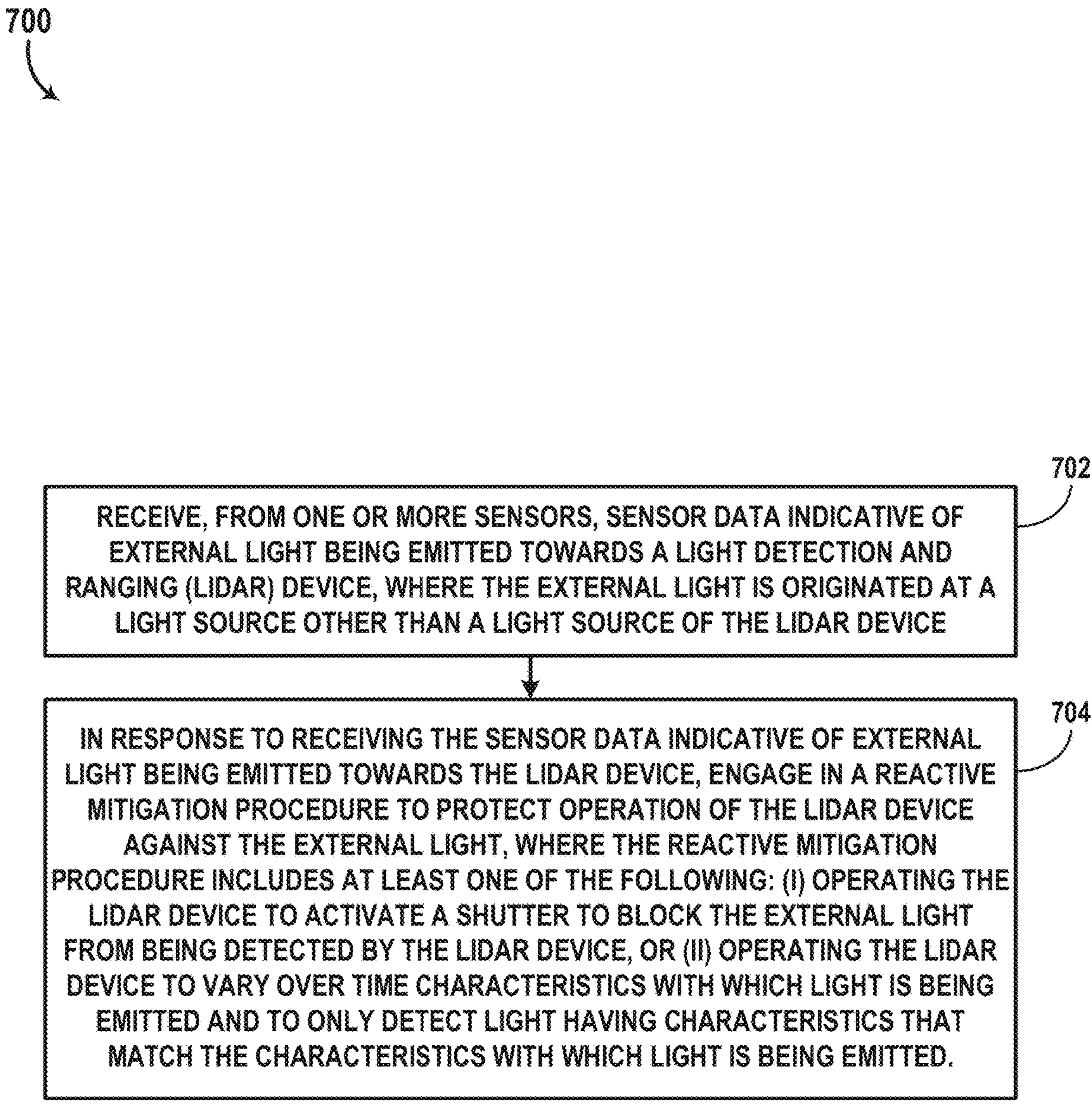
FIG. 7 is a flowchart illustrating a method for operating a LIDAR device to carry out a mitigation procedure, according to an example embodiment.

FIG. 7 is a flowchart illustrating a method 700, according to an example implementation. In particular, method 700 may be implemented to carry out a mitigation procedure in response to detection of external light (via an offset light detector). Thus, method 700 presents an embodiment of a method that could be used with any of LIDAR devices 100, 200, LIDAR receiver 314, vehicles 400, 500, and/or method 600, for example. Method 700 may include one or more operations, functions, or actions as illustrated by one or more of blocks 702-704. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, method 700 involves receiving, from one or more sensors, sensor data indicative of external light being emitted towards a LIDAR device, where the external light is originated at a light source other than a light source of the LIDAR device. In accordance with an example implementation, a sensor that is configured to generate sensor data indicative of external light being emitted may take on one or more of various forms.

In one example, an external sensor may be coupled to the LIDAR device (e.g., to housing 224, etc.) and may be configured to generate sensor data indicative of external light. For instance, the external sensor may be a light sensor or the like that is configured to receive light having optical characteristics similar to those of the light that the LIDAR device currently emits. If the external sensor detects light, the external sensor at issue may responsively transmit a signal to the control system. In response to receiving the signal, the control system may determine that external light is being emitted towards the LIDAR device.

In another example, the sensor configured to generate sensor data indicative of external light may be within the LIDAR device itself. For instance, the LIDAR device may include a photodetector (e.g., in the detector array or adjacent to the array) configured to receive light having optical characteristics similar to those of the light that the LIDAR device emits. If the photodetector detects light, the photodetector at issue may responsively generate a signal based on which data is then generated. And based at least on that data being generated due to the photodetector at issue, the control system may determine that external light is being emitted towards the LIDAR device.

In yet another example, the sensor configured to generate sensor data indicative of external light may be a sensor of a vehicle other than the LIDAR device. For instance, any of the sensors in sensor system 404 could be used for this purpose. However, various other sensors could additionally or alternatively be used for that purpose as well. In a specific example, the control system may receive image data from a camera (e.g., camera 434) and the control system may determine that the image data indicates an external light source in the environment (e.g., using currently known or future developed object recognition techniques). In this example, the control system may thus determine based on the image data that external light is being emitted or at least could be emitted towards the LIDAR device.

At block 704, method 700 involves, in response to receiving the sensor data indicative of external light being emitted towards the LIDAR device, engaging in a mitigation procedure to protect operation of the LIDAR device against the external light, where the mitigation procedure comprises at least one of the following: (i) operating the LIDAR device to activate a shutter to block the external light from being detected by the LIDAR device, or (ii) operating the LIDAR device to vary over time characteristics with which light is being emitted and to only detect light having characteristics that match the characteristics with which light is being emitted.

V. EXAMPLE MITIGATION PROCEDURES TO PROTECT A LIDAR DEVICE i. Shutter Activation

In accordance with the present disclosure, a control system (e.g., controller 104, computer system 410, control system 406, etc.) may respond to detection of external light by operating a LIDAR device to activate a shutter to block the external light from being detected by the LIDAR device. In practice, the control system may activate the shutter temporarily. In this way, the control system may help block detection of external light by the LIDAR device while allowing the LIDAR device to continue to provide information about the environment over time. Generally, the shutter at issue may take on one of various forms.

In one case, the shutter may be a mechanical shutter. For example, a mechanical shutter may take the form of a focal plane shutter, a simple leaf shutter, a diaphragm shutter, and/or a central shutter, among other options. In this case, the control system may activate the mechanical shutter by transmitting a signal or the like to actuate ("close") the shutter to block external light from being detected by the LIDAR device.

In another case, the shutter may be an optical shutter. In particular, when activated, the optical shutter may filter out light having one or more target wavelengths and may pass through light having wavelengths other than the one or more target wavelengths. For example, the optical shutter may be the above described adaptive filter (e.g., light filter 348, etc.). As such, the control system could operate the LIDAR device to activate the adaptive filter. Moreover, the control system could determine a wavelength of the external light (e.g. based on the received sensor data) and could then responsively reconfigure the adaptive filter to select the determined wavelength as at least one of the target wavelengths that the adaptive filter filters out. In this manner, the control system may enable the LIDAR device to detect light that has been transmitted from the LIDAR device and reflected from one or more objects in the environment but not detect other (e.g., potentially harmful) light. Other cases and examples are possible as well.

In a further aspect, the LIDAR device may include a look-ahead sensor (e.g., offset light detectors 340, 342, 344, 346, etc.) arranged to generate sensor data indicative of external light being emitted towards the LIDAR device from a particular portion of the environment. In some instances, the look-ahead sensor could be positioned so as to effectively check a portion of the environment for external light before the LIDAR device rotates to a position in which the LIDAR device scans that portion of the environment. Once the control system determines that the LIDAR device has rotated to a position in which the LIDAR device is scanning or is about to scan that portion of the environment, the control system may responsively activate the shutter to block the external light from being detected.

Given this arrangement, if the look-ahead sensor determines that external light is being emitted toward the LIDAR device, the control system may use one or more of various approaches to determine, based on data from the look-ahead sensor, the particular portion of the environment from which external light is being emitted, and thus when to activate the shutter.

In an example approach, the control system may receive, from the look-ahead sensor, sensor data indicative of external light. In this approach, the control system may determine a particular angular position the look-ahead sensor (e.g., using a rotary encoder) at the time when the look-ahead sensor detects the external light. Then, based on an angular offset between a location of the look-ahead sensor on the LIDAR device and a location of the LIDAR device's aperture through which light is received, the control system may determine that the aperture will be at the particular angular position after the LIDAR device rotates by an extent that substantially matches the angular offset. As such, the control system may activate the shutter in response to a determination that the aperture is at the particular angular position. In practice, the control system may make such a determination by using the rotary encoder to determine that the LIDAR device has rotated by an extent that substantially matches the angular offset at issue, or may do so in other ways.

Moreover, in some cases, the control system may also use the refresh rate of the LIDAR device in combination with the angular offset so as to determine or estimate a time when the aperture is expected to be at the particular angular position. In such cases, the control system may activate the shutter at that time when the aperture is expected to be at the particular angular position. Other cases and approaches are also possible.

Furthermore, as noted, the control system may only temporarily activate the shutter. In the context of the look-ahead sensor arrangement, the control system may activate the shutter only while the LIDAR device is scanning or is about to scan the particular portion of the environment from which external light being emitted towards the LIDAR device. For example, the control system may determine (e.g., using the rotary encoder) that the LIDAR device is no longer scanning the particular portion of the environment. Responsively, the control system may operate the LIDAR device to deactivate the shutter so as to no longer block light. Generally, the control sensor may do so only if the look-ahead sensor did not generate sensor data indicating that external light is being emitted from a subsequent portion of the environment. In a situation when the look-ahead sensor did generate such data, the control system would operate the LIDAR device to maintain activation of the shutter to block external light in accordance with the discussion above, and so on.

Figure 8A:
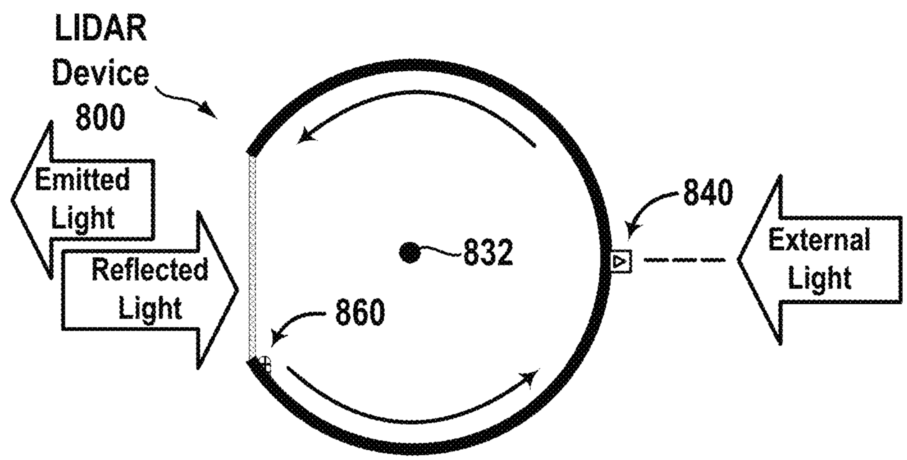
FIG. 8A illustrates a step in protection of a LIDAR device using a look-ahead sensor, according to an example embodiment.
Figure 8B:
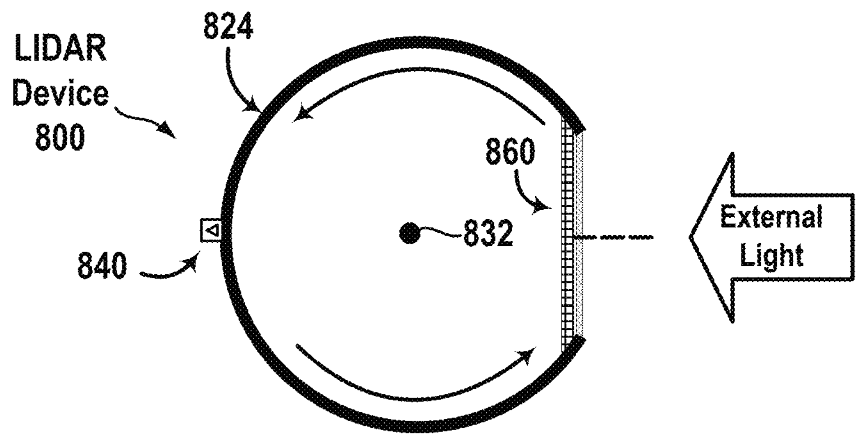
FIG. 8B illustrates another step in protection of a LIDAR device using a look-ahead sensor, according to an example embodiment.
Figure 8C:
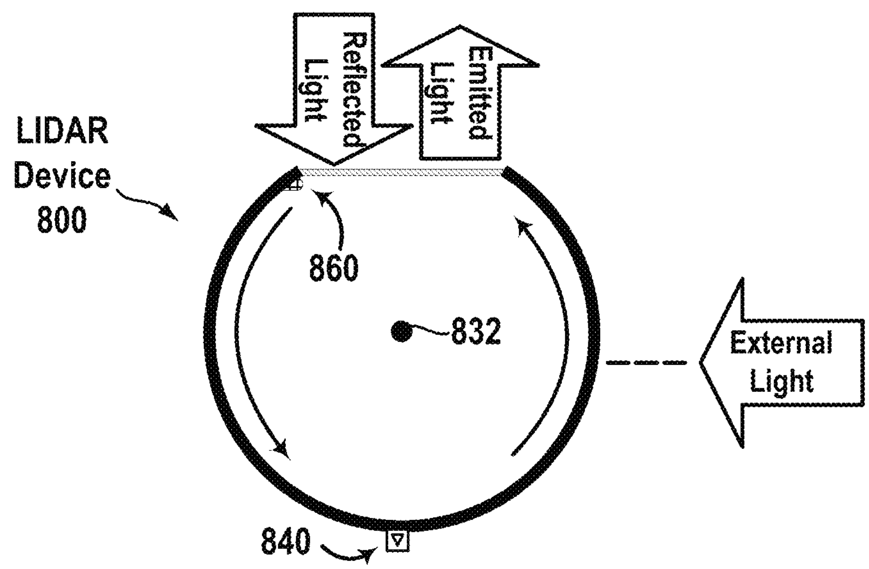
FIG. 8C illustrates yet another step in protection of a LIDAR device using a look-ahead sensor, according to an example embodiment.

FIGS. 8A to 8C illustrate activation of a shutter in the context of a look-ahead sensor arrangement. In FIGS. 8A to 8C, a top-view of a LIDAR device 800 is illustrated as the LIDAR device 800 rotates about axis 832. LIDAR device 800 may be similar to LIDAR devices 100 and 200, for example. To that end, housing 824 and axis 832 may be similar, respectively, to housing 224 and axis 232.

FIG. 8A illustrates that, while LIDAR device 800 emits light and detects reflected light, a look-ahead sensor 840 detects external light being emitted towards the LIDAR device from a particular portion of the environment. Look-ahead sensor 840 may be an offset light detect similar to any of offset light detectors 340, 342, 344, 346, for example. However, unlike offset light detectors 340, 342, 344, 346, look-ahead sensor 840 is shown as a separate sensor (e.g., disposed outside LIDAR receiver 314) that is disposed on housing 824 of LIDAR device 800.

FIG. 8B then illustrates that a mechanical shutter 860 has been activated once LIDAR device 800 has rotated to a position in which the LIDAR device 800 is arranged to scan the particular portion of the environment. As such, mechanical shutter 860 blocks the external light, as shown by FIG. 8B. Finally, after LIDAR device 800 has further rotated and is no longer scanning the particular portion of the environment, mechanical shutter 860 is deactivated to no longer block light, as shown by FIG. 8C.

ii. Variation of Optical Characteristics

In accordance with the present disclosure, a control system (e.g., controller 104, computer system 410, control system 406, etc.) may additionally or alternatively respond to detection of external light by operating a LIDAR device to vary over time characteristics with which light is being emitted and to only detect light having characteristics that are the same as the characteristics with which light is being emitted. As such, the control system may respond to detection of external light by operating the LIDAR device to vary timing, wavelengths, intensity, and/or modulation of the light emitted by the LIDAR device.

In a further aspect, responding to detection of external light by varying optical characteristics may involve use of a backup wavelength to help protect the LIDAR device against external light. In particular, the control system may operate the LIDAR device to emit a first wavelength and to at least detect external light having the first wavelength. Then, the control system may operate the LIDAR device to continue to emit light having the first wavelength and to additionally emit light having a second wavelength that is different from the first wavelength. Further, the control system may also operate the LIDAR device to no longer detect light having the first wavelength and to instead detect light having the second wavelength, even as the LIDAR device continues to emit light having the first wavelength.

In practice, use of the backup wavelength may help increase the difficulty of ascertaining which wavelength is in fact being used for detection by the LIDAR device. For instance, optical characteristics of the external light could be manually or automatically altered to match the set of optical characteristics of light being emitted and detected by the LIDAR device. For this reason, the wavelength of the external light could be manually or automatically altered to match the initially emitted first wavelength and the wavelength of the external light may continue matching the first wavelength due to continued emission of light having the first wavelength. But such matching may no longer present an issue because the control system has begun operating the LIDAR device to instead detect light having the backup second wavelength. Moreover, in some cases, the control system may carry out the disclosed use of the backup second wavelengths specifically in response to determining that the external light has the matching first wavelength.

Figure 9A:
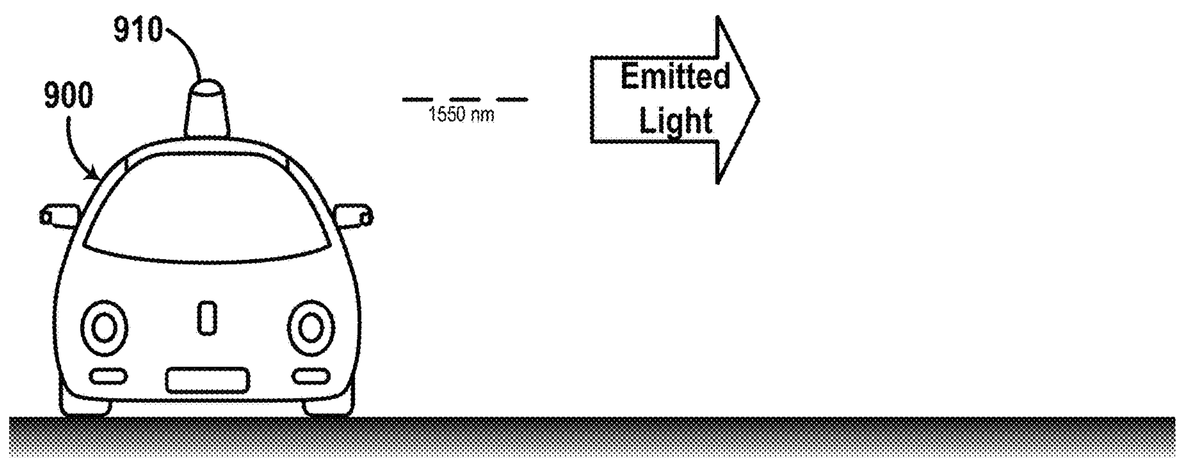
FIG. 9A illustrates a step in protection of a LIDAR device using emission and detection of a backup wavelength, according to an example embodiment.
Figure 9B:
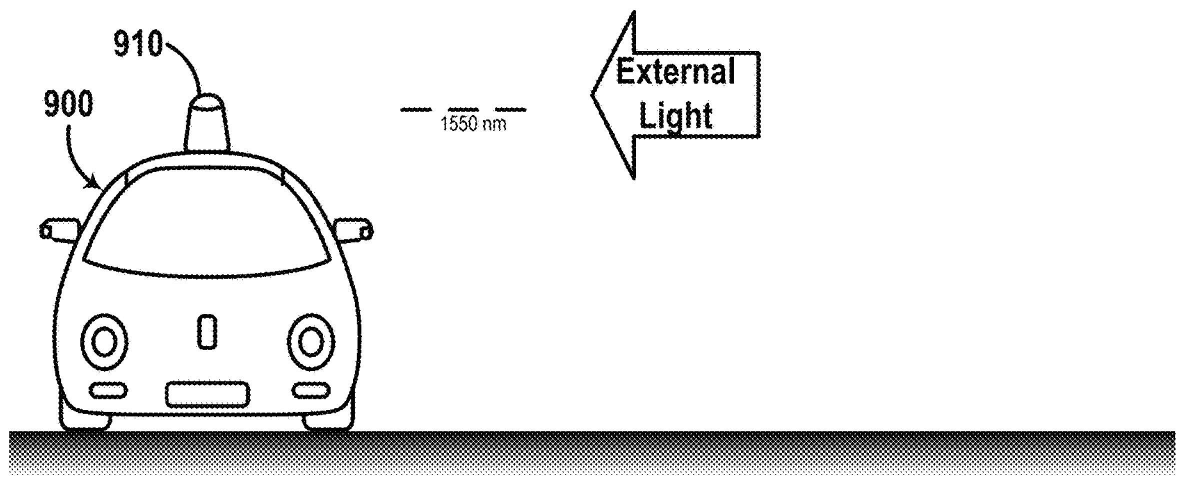
FIG. 9B illustrates another step in protection of a LIDAR device using emission and detection of a backup wavelength, according to an example embodiment.
Figure 9C:
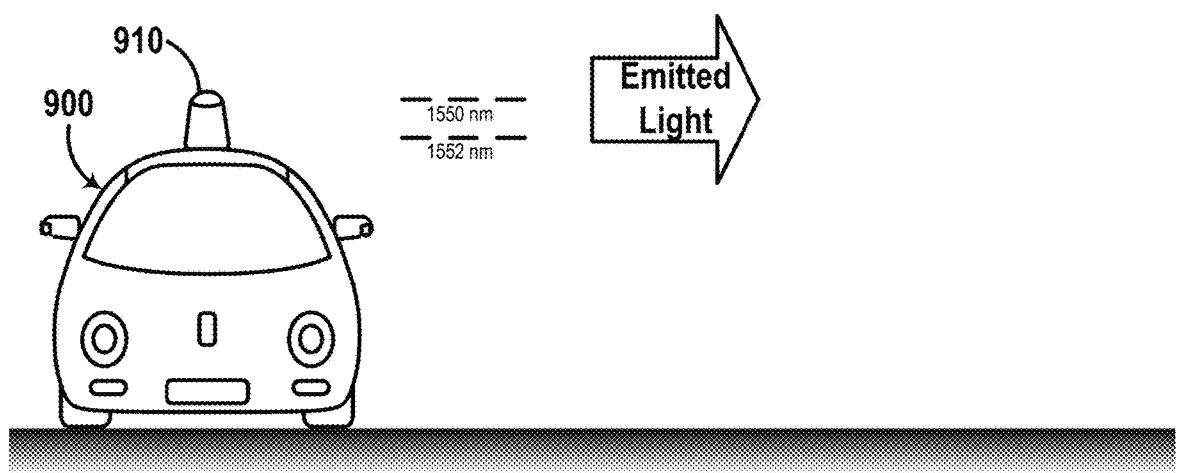
FIG. 9C illustrates yet another step in protection of a LIDAR device using emission and detection of a backup wavelength, according to an example embodiment.

FIGS. 9A-9C illustrate use of a backup wavelength to help protect a LIDAR device against external light. As shown in FIGS. 9A-9C, a vehicle 900 having a LIDAR device 910 is operating in an environment. For example, vehicle 900 and LIDAR device 910 may be similar, respectively, to vehicle 500 and LIDAR device 510.

In line with the discussion above, LIDAR device 910 may be initially configured to emit light having a wavelength of 1550 nm (e.g., via transmitter 206), as shown in FIG. 9A, and may detect (e.g., via receiver 214) light having a wavelength of 1550 nm. As shown in FIG. 9B, emission of external light (having the same wavelength of 1550 nm) towards the LIDAR device may be detected. Responsively, as shown in FIG. 9C, LIDAR device 910 then emits light having the wavelength of 1550 nm as well as light having a backup wavelength of 1552 nm. In accordance with the discussion above, however, LIDAR device 910 may be operated to no longer detect light having the wavelength of 1550 nm and to instead detect light having the wavelength of 1552 nm. In this way, there may be an increase in difficulty of ascertaining which wavelength is in fact being used for detection by LIDAR device 910.

VI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed:

1. A light detection and ranging (LIDAR) device comprising:

a transmitter configured to emit light pulses into an environment of the LIDAR device to provide an illuminated region of the environment;

light detectors configured to generate sensor data indicative of light detected by the light detectors, wherein the light detectors include a light detector array and an offset light detector; and a controller, wherein the controller is configured to perform operations comprising:

receiving the sensor data indicative of light detected by the light detectors; and detecting a possible spoofing device based on the sensor data indicative of light detected by the light detectors, wherein detecting the possible spoofing device comprises determining that the sensor data indicative of light detected by the light detectors includes sensor data from the offset light detector indicative of detected light emitted by an external light source located in a region of the environment that is not being illuminated by the transmitter.

2. The LIDAR device of claim 1, wherein detecting the possible spoofing device further comprises:

determining optical characteristics of the detected light emitted by the external light source, wherein the optical characteristics include at least one of a waveform shape, a light pulse duration, a wavelength, or a modulation; and performing a comparison of the optical characteristics of the detected light emitted by the external light source to the optical characteristics of the light pulses emitted by the transmitter.

3. The LIDAR device of claim 2, wherein detecting the possible spoofing device further comprises:

determining that the external light source is the possible spoofing device based on the comparison indicating that the optical characteristics of the detected light emitted by the external light source are similar to the optical characteristics of the light pulses emitted by the transmitter.

4. The LIDAR device of claim 2, wherein detecting the possible spoofing device further comprises:

determining that the external light source is the possible spoofing device based on the comparison indicating that the optical characteristics of the detected light emitted by the external light source match the optical characteristics of the light pulses emitted by the transmitter.

5. The LIDAR device of claim 1, wherein the light detector array is configured to detect light within a current field-of-view (FOV), the current FOV comprising the illuminated region of the environment, and wherein the offset light detector is configured to detect light from outside of the current FOV.

6. The LIDAR device of claim 5, further comprising:

a lens, wherein the lens is configured to focus light propagating toward the LIDAR device from the illuminated region of the environment along a predefined optical path.

7. The LIDAR device of claim 6, wherein the light detector array is positioned along the predefined optical path to intercept and detect the light propagating toward the LIDAR device from the illuminated region of the environment focused by the lens along the predefined optical path, and wherein the offset light detector is positioned outside the predefined optical path.

8. The LIDAR device of claim 1, wherein the operations further comprise:

engaging in a mitigation procedure in response to detecting the possible spoofing device.

9. The LIDAR device of claim 8, wherein engaging in the mitigation procedure comprises:

operating the LIDAR device to block light emitted by the possible spoofing device.

10. The LIDAR device of claim 9, wherein operating the LIDAR device to block light emitted by the possible spoofing device comprises activating at least one of a shutter or a filter.

11. The LIDAR device of claim 8, wherein engaging in the mitigation procedure comprises:

controlling the transmitter such that the transmitter adjusts one or more characteristics of the light pulses emitted by the transmitter.

12. The LIDAR device of claim 11, wherein the one or more characteristics of the light pulses emitted by the transmitter comprise at least one of a timing of the light pulses, a wavelength of the light pulses, or a modulation of the light pulses.

13. A method, comprising:

emitting, by a transmitter of a light detection and ranging (LIDAR) device, light pulses into an environment of the LIDAR device to provide an illuminated region of the environment;

generating, by light detectors of the LIDAR device, sensor data indicative of light detected by the light detectors, wherein the light detectors include a light detector array and an offset light detector;

receiving, by a controller, the sensor data indicative of light detected by the light detectors; and detecting, by the controller, a possible spoofing device based on the sensor data indicative of light detected by the light detectors, wherein detecting the possible spoofing device comprises determining that the sensor data indicative of light detected by the light detectors includes sensor data from the offset light detector indicative of detected light emitted by an external light source located in a region of the environment that is not being illuminated by the transmitter.

14. The method of claim 13, wherein detecting the possible spoofing device further comprises:

determining optical characteristics of the detected light emitted by the external light source, wherein the optical characteristics include at least one of a waveform shape, a light pulse duration, a wavelength, or a modulation; and performing a comparison of the optical characteristics of the detected light emitted by the external light source to the optical characteristics of the light pulses emitted by the transmitter.

15. The method of claim 13, further comprising:

engaging in a mitigation procedure in response to detecting the possible spoofing device.

16. The method of claim 15, wherein engaging in the mitigation procedure comprises:

operating the LIDAR device to block light emitted by the possible spoofing device.

17. The method of claim 15, wherein engaging in the mitigation procedure comprises:

controlling the transmitter such that the transmitter adjusts one or more characteristics of the light pulses emitted by the transmitter, wherein the one or more characteristics of the light pulses emitted by the transmitter comprise at least one of a timing of the light pulses, a wavelength of the light pulses, or a modulation of the light pulses.

18. The method of claim 13, wherein the light detector array is configured to detect light within a current field-of-view (FOV), the current FOV comprising the illuminated region of the environment, and wherein the offset light detector is configured to detect light from outside of the current FOV.

19. The method of claim 14, wherein detecting the possible spoofing device further comprises:

determining that the external light source is the possible spoofing device based on the comparison indicating that the optical characteristics of the detected light emitted by the external light source are similar to the optical characteristics of the light pulses emitted by the transmitter.

20. The method of claim 14, wherein detecting the possible spoofing device further comprises:

determining that the external light source is the possible spoofing device based on the comparison indicating that the optical characteristics of the detected light emitted by the external light source match the optical characteristics of the light pulses emitted by the transmitter.

* * * * *